US009473272B2

(12) United States Patent
Cave et al.

(10) Patent No.: US 9,473,272 B2
(45) Date of Patent: *Oct. 18, 2016

(54) MAC AND RLC ARCHITECTURE AND PROCEDURES TO ENABLE RECEPTION FROM MULTIPLE TRANSMISSION POINTS

(71) Applicant: INTERDIGITAL PATENT HOLDINGS, INC., Wilmington (DE)

(72) Inventors: Christopher R. Cave, Dollard-des-Ormeaux (CA); Diana Pani, Montreal (CA); Sylvie Gomes, Manhasset, NY (US)

(73) Assignee: InterDigital Patent Holdings, Inc., Wilmington, DE (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/694,295

(22) Filed: Apr. 23, 2015

(65) Prior Publication Data

US 2015/0229448 A1 Aug. 13, 2015

Related U.S. Application Data

(63) Continuation of application No. 14/164,890, filed on Jan. 27, 2014, now Pat. No. 9,049,016, which is a continuation of application No. 13/250,133, filed on Sep. 30, 2011, now Pat. No. 8,638,723.

(60) Provisional application No. 61/388,976, filed on Oct. 1, 2010.

(51) Int. Cl.
*H04L 1/18* (2006.01)
*H04W 24/10* (2009.01)

(52) U.S. Cl.
CPC ........... *H04L 1/1841* (2013.01); *H04L 1/1848* (2013.01); *H04W 24/10* (2013.01)

(58) Field of Classification Search
CPC .................. H04L 1/1841; H04W 24/10
See application file for complete search history.

(56) References Cited

U.S. PATENT DOCUMENTS

| 8,116,250 B2 | 2/2012 | Lindskog et al. |
| 2005/0270996 A1 | 12/2005 | Yi et al. |

(Continued)

FOREIGN PATENT DOCUMENTS

| CN | 101060386 | 10/2007 |
| EP | 1 643 794 | 4/2006 |

(Continued)

OTHER PUBLICATIONS

Alcatel-Lucent, Alcatel-Lucent Shanghai Bell, "Discussion on SFDC-HSDPA," R1-104383, 3GPP TSG-RAN WG1 Meeting #62, Madrid, Spain, Aug. 23-27, 2010.

(Continued)

*Primary Examiner* — Brian D Nguyen
(74) *Attorney, Agent, or Firm* — Volpe and Koenig, P.C.

(57) ABSTRACT

A method for use in a wireless communication system for two-stage reordering of received protocol data units (PDUs). The method comprising receiving PDUs from Node-Bs, wherein each of the received PDUs has a transmission sequence number (TSN), reordering the received PDUs from Node-Bs using the TSN in a MAC layer in different reordering queues, delivering the received PDUs from reordering queues to one logical channel in the RLC layer, reordering the received PDUs in the RLC layer based on a sequence number (SN), starting a timer when at least a RLC PDU is missing based on SN of the RLC PDU, and transmitting a status report indicating a missing RLC PDU based on SN of the RLC PDU if the timer expires, wherein transmission of the status report is delayed if a RLC PDU is missing based on SN of the RLC PDU and the timer is running.

8 Claims, 19 Drawing Sheets

(56) References Cited

U.S. PATENT DOCUMENTS

| | | |
|---|---|---|
| 2008/0042782 A1 | 2/2008 | Wang et al. |
| 2008/0095116 A1 | 4/2008 | Kim et al. |
| 2008/0209297 A1 | 8/2008 | Chandra et al. |
| 2008/0212588 A1* | 9/2008 | Yi et al. ............... 370/394 |
| 2008/0225765 A1 | 9/2008 | Marinier et al. |
| 2009/0028126 A1 | 1/2009 | Meylan |
| 2009/0046626 A1* | 2/2009 | Shao et al. ............ 370/320 |
| 2009/0086708 A1 | 4/2009 | Pani et al. |
| 2009/0213729 A1 | 8/2009 | Zhang et al. |
| 2010/0039996 A1* | 2/2010 | Ohta et al. ............ 370/328 |
| 2010/0080170 A1 | 4/2010 | Larmo et al. |
| 2010/0208651 A1 | 8/2010 | Ramos Peres et al. |
| 2010/0220638 A1 | 9/2010 | Carmon et al. |
| 2010/0232356 A1* | 9/2010 | Maheshwari et al. ..... 370/328 |
| 2010/0296464 A1 | 11/2010 | Barraclough et al. |
| 2010/0325502 A1 | 12/2010 | Lindskog et al. |
| 2011/0149870 A1* | 6/2011 | Yi et al. ............... 370/328 |
| 2011/0149919 A1 | 6/2011 | Kapoor et al. |
| 2011/0176492 A1* | 7/2011 | Sung et al. ............ 370/328 |

FOREIGN PATENT DOCUMENTS

| | | |
|---|---|---|
| WO | 2004/091129 | 10/2004 |
| WO | 2010/088538 | 8/2010 |

OTHER PUBLICATIONS

Ericsson et al., "Introduction of Dual Cell Operation," 3GPP TSG RAN WG2 meeting #64, R2-087441, Prague, Czech Republic (Nov. 10-14, 2008).

Nokia Siemens Networks, Nokia, "Multi-Cell Transmission Techniques for HSDPA," R1-104913, 3GPP TSG-RAN WG1 Meeting #62, Madrid, Spain, Aug. 23-27, 2010.

Qualcomm Incorporated, "Further Details and Benefits of Deploying DC-HSDPA UEs in Single Frequency Networks," R1-104738, 3GPP TSG-RAN WG1 Meeting #62, Madrid, Spain, Aug. 23-27, 2010.

Qualcomm Incorporated, "On Deploying DC-HSDPA UEs in Single Frequency Networks," R1-103859, 3GPP TSG RAN WG1 Meeting #60-bis, Dresden, Germany, Jun. 29-Jul. 2, 2010.

Third Generation Partnership Project, "Technical Specification Group Radio Access Network; Medium Access Control (MAC) Protocol Specification (Release 7)," 3GPP TS 25.321 v7.17.0, Jun. 2010.

Third Generation Partnership Project, "Technical Specification Group Radio Access Network; Medium Access Control (MAC) Protocol Specification (Release 7)," 3GPP TS 25.321 v7.19.0, Dec. 2010.

Third Generation Partnership Project, "Technical Specification Group Radio Access Network; Medium Access Control (MAC) Protocol Specification (Release 8)," 3GPP TS 25.321 v8.10.0, Jun. 2010.

Third Generation Partnership Project, "Technical Specification Group Radio Access Network; Medium Access Control (MAC) Protocol Specification (Release 8)," 3GPP TS 25.321 v8.13.0, Jun. 2011.

Third Generation Partnership Project, "Technical Specification Group Radio Access Network; Medium Access Control (MAC) Protocol Specification (Release 9)," 3GPP TS 25.321 v9.3.0, Jun. 2010.

Third Generation Partnership Project, "Technical Specification Group Radio Access Network; Medium Access Control (MAC) Protocol Specification (Release 9)," 3GPP TS 25.321 v9.6.0, Jun. 2011.

Third Generation Partnership Project, "Technical Specification Group Radio Access Network; Medium Access Control (MAC) Protocol Specification (Release 10)," 3GPP TS 25.321 v10.3.0, Jun. 2011.

Third Generation Partnership Project, "Technical Specification Group Radio Access Network; Radio Interface Protocol Architecture (Release 7)," 3GPP TS 25.301 v7.5.0, Jun. 2010.

Third Generation Partnership Project, "Technical Specification Group Radio Access Network; Radio Interface Protocol Architecture (Release 8)," 3GPP TS 25.301 v8.7.0, Jun. 2010.

Third Generation Partnership Project, "Technical Specification Group Radio Access Network; Radio Interface Protocol Architecture (Release 9)," 3GPP TS 25.301 v9.2.0, Jun. 2010.

Third Generation Partnership Project, "Technical Specification Group Radio Access Network; Radio Interface Protocol Architecture (Release 10)," 3GPP TS 25.301 v10.0.0, Mar. 2011.

Third Generation Partnership Project, "Technical Specification Group Radio Access Network; Radio Link Control (RLC) Protocol Specification (Release 8)," 3GPP TS 25.322 v8.9.0, Jun. 2010.

Third Generation Partnership Project, "Technical Specification Group Radio Access Network; Radio Link Control (RLC) Protocol Specification (Release 9)," 3GPP TS 25.322 v9.2.0, Jun. 2010.

Third Generation Partnership Project, "Technical Specification Group Radio Access Network; Radio Link Control (RLC) Protocol Specification (Release 9)," 3GPP TS 25.322 v9.3.0, Jun. 2011.

Third Generation Partnership Project, "Technical Specification Group Radio Access Network; Radio Link Control (RLC) Protocol Specification (Release 10)," 3GPP TS 25.322 v10.1.0, Jun. 2011.

Third Generation Partnership Project, "Technical Specification Group Radio Access Network; High Speed Downlink Packet Access (HSDPA); Overall description; Stage 2 (Release 5)," 3GPP TS 25.308 V5.7.0 (Dec. 2004).

Third Generation Partnership Project, "Technical Specification Group Radio Access Network; High Speed Downlink Packet Access (HSDPA); Overall description; Stage 2 (Release 6)," 3GPP TS 25.308 V6.4.0 (Mar. 2007).

Third Generation Partnership Project, "Technical Specification Group Radio Access Network; Radio Resource Control (RRC) protocol specification (Release 1999)," 3GPP TS 25.331 V3.21.0 (Dec. 2004).

Third Generation Partnership Project, "Technical Specification Group Radio Access Network; Radio Resource Control (RRC); Protocol Specification (Release 4)," 3GPP TS 25.331 V4.20.0 (Dec. 2008).

Third Generation Partnership Project, "Technical Specification Group Radio Access Network; Radio Resource Control (RRC); Protocol Specification (Release 5)," 3GPP TS 25.331 V5.24.0 (Jun. 2009).

Third Generation Partnership Project, "Technical Specification Group Radio Access Network; Radio Resource Control (RRC); Protocol Specification (Release 7)," 3GPP TS 25.331 V7.17.0 (Jun. 2010).

Third Generation Partnership Project, "Technical Specification Group Radio Access Network; Radio Resource Control (RRC); Protocol Specification (Release 6)," 3GPP TS 25.331 V6.25.0 (Mar. 2010).

Third Generation Partnership Project, "Technical Specification Group Radio Access Network; Radio Resource Control (RRC); Protocol Specification (Release 7)," 3GPP TS 25.331 v7.20.0, Jun. 2011.

Third Generation Partnership Project, "Technical Specification Group Radio Access Network; Radio Resource Control (RRC); Protocol Specification (Release 8)," 3GPP TS 25.331 v8.15.0, Jun. 2011.

Third Generation Partnership Project, "Technical Specification Group Radio Access Network; Radio Resource Control (RRC); Protocol Specification (Release 9)," 3GPP TS 25.331 v9.7.0, Jul. 2011.

Third Generation Partnership Project, "Technical Specification Group Radio Access Network; Radio Resource Control (RRC); Protocol specification (Release 8)," 3GPP TS 25.331 V8.11.0 (Jun. 2010).

Third Generation Partnership Project, "Technical Specification Group Radio Access Network; Radio Resource Control (RRC); Protocol specification (Release 9)," 3GPP TS 25.331 V9.3.0 (Jun. 2010).

(56) References Cited

OTHER PUBLICATIONS

Third Generation Partnership Project, "Technical Specification Group Radio Access Network; Radio Resource Control (RRC); Protocol specification (Release 10)," 3GPP TS 25.331 V10.0.0 (Jun. 2010).

Third Generation Partnership Project, "Technical Specification Group Radio Access Network; High Speed Packet Access (HSDPA) multipoint transmission (Release 11)," 3GPP TR 25.872 V11.0.0 (Sep. 2011).

Third Generation Partnership Project, "Technical Specification Group Radio Access Network; Radio Resource Control (RRC); Protocol specification (Release 10)," 3GPP TS 25.331 V10.4.0 (Jun. 2011).

Third Generation Partnership Project, "Technical Specification Group Radio Access Network; High Speed Downlink Packet Access (HSDPA); Overall description; Stage 2 (Release 10)," 3GPP TS 25.308 V10.5.0 (Jun. 2011).

Third Generation Partnership Project, "Technical Specification Group Radio Access Network; High Speed Downlink Packet Access (HSDPA); Overall description; Stage 2 (Release 10)," 3GPP TS 25.308 V10.1.0 (Jun. 2010).

Third Generation Partnership Project, "Technical Specification Group Radio Access Network; High Speed Downlink Packet Access (HSDPA); Overall description; Stage 2 (Release 9)," 3GPP TS 25.308 V9.6.0 (Jun. 2011).

Third Generation Partnership Project, "Technical Specification Group Radio Access Network; High Speed Downlink Packet Access (HSDPA); Overall description; Stage 2 (Release 9)," 3GPP TS 25.308 V9.3.0 (Jun. 2010).

Third Generation Partnership Project, "Technical Specification Group Radio Access Network; High Speed Downlink Packet Access (HSDPA); Overall description; Stage 2 (Release 8)," 3GPP TS 25.308 V8.11.0 (Jun. 2011).

Third Generation Partnership Project, "Technical Specification Group Radio Access Network; High Speed Downlink Packet Access (HSDPA); Overall description; Stage 2 (Release 7)," 3GPP TS 25.308 V7.10.0 (Jun. 2009).

Third Generation Partnership Project, "Technical Specification Group Radio Access Network; High Speed Downlink Packet Access (HSDPA); Overall description; Stage 2 (Release 7)," 3GPP TS 25.308 V7.12.0 (Mar. 2011).

Third Generation Partnership Project, "Technical Specification Group Radio Access Network; High Speed Downlink Packet Access (HSDPA); Overall description; Stage 2 (Release 8)," 3GPP TS 25.308 V8.6.0 (Jun. 2009).

Nokia Siemens Networks et al., "HSDPA Multiflow data split options," 3GPP TSG-RAN WG2 Meeting #74, R2-113166, Barcelona, Spain (May 9-13, 2011).

* cited by examiner

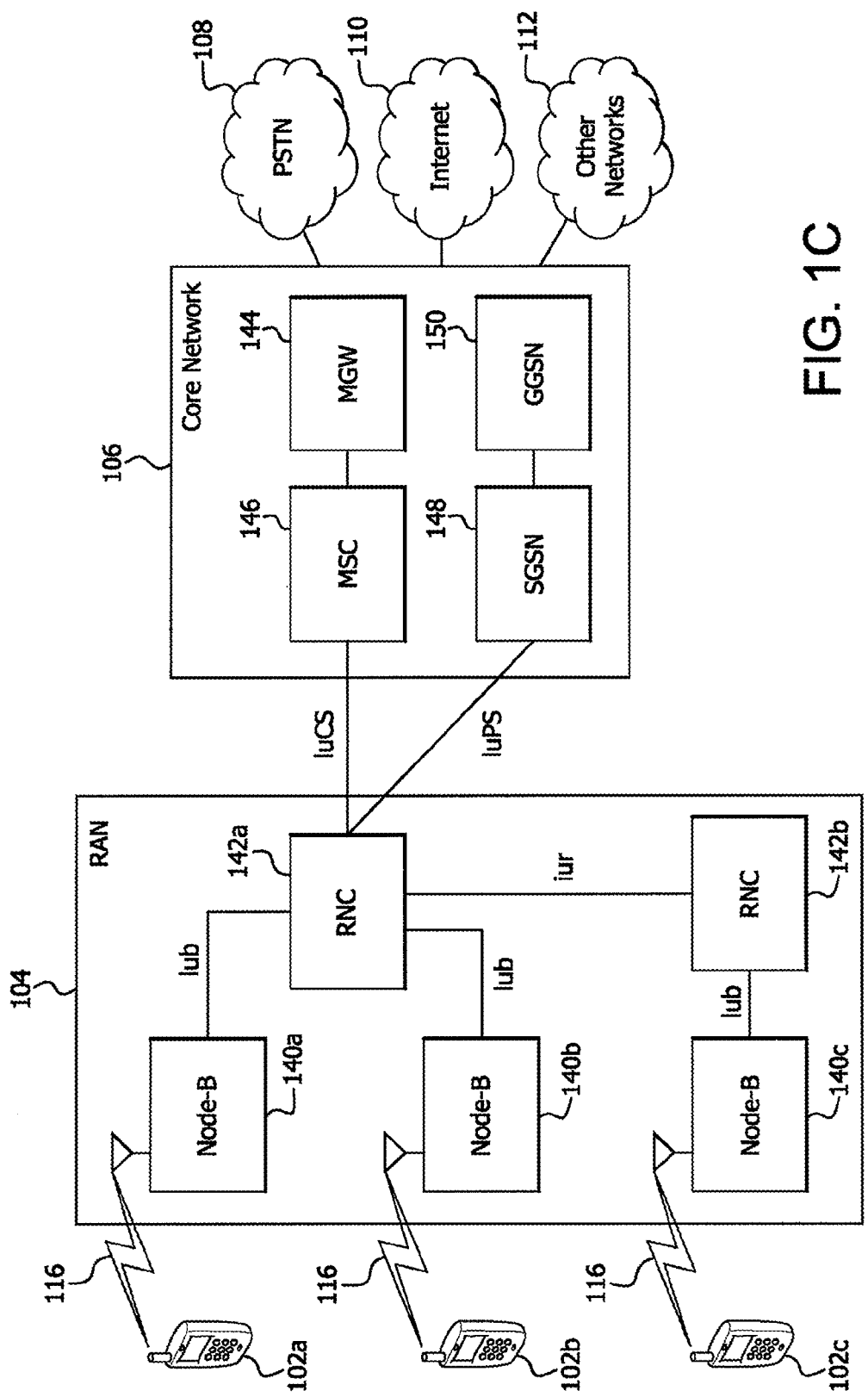

MAC AND RLC ARCHITECTURE AND PROCEDURES TO ENABLE RECEPTION FROM MULTIPLE TRANSMISSION POINTS

CROSS REFERENCE TO RELATED APPLICATIONS

This application is a continuation of U.S. patent application Ser. No. 14/164,890 filed Jan. 27, 2014, which issued as U.S. Pat. No. 9,049,016 on Jun. 2, 2015; which is a continuation of U.S. patent application Ser. No. 13/250,133 filed Sep. 30, 2011, which issued as U.S. Pat. No. 8,638,723 on Jan. 28, 2014, which claims the benefit U.S. provisional application No. 61/388,976 filed Oct. 1, 2010, the contents of which is hereby incorporated by reference herein.

BACKGROUND

In Release-7 of Universal Mobile Telecommunications System (UMTS), the Single Cell Downlink Machine Input Machine Output (SC-MIMO) feature was introduced. SC-MIMO allows a Node-B to transmit two transport blocks to a single wireless transmit/receive unit (WTRU) from the same sector on a pair of transmit antennas improving data rates at high geometries and providing a beam forming advantage to the WTRU in low geometry conditions.

In Release-8 and Release-9 of UMTS, the Dual Cell High Speed Downlink Packet Access (DC-HSDPA) and Dual Band DC-HSDPA features were introduced. Both these features allow the Node-B to serve one or more users by simultaneous operation of HSDPA on two different frequency channels in the same sector, improving experience across the entire cell. The common part of these features is that they allow for simultaneous downlink reception of two independent transport blocks at the WTRU, where the transport blocks are transmitted on the High Speed Downlink Shared Channel (HS-DSCH) by a single Node-B sector.

Another technique that is based on the simultaneous reception of two or more transport blocks from different cells in the same or different frequency is multipoint operation. Multipoint operation consists in transmitting two independent transport blocks to the WTRU, wherein the transport blocks are transmitted from different Node-B sectors or cells on the same frequency or different frequency and geographically separated points. This may be seen as an extension of the DC-HSDPA feature on geographically separated cells on the same or different frequencies.

Multipoint transmissions may operate with two cells located on two different Node-Bs or in two different sites, referred to hereafter as inter-site multiflow operation, and an Radio Network Controller (RNC) will split data between two Node-Bs. Each Node-B may then perform MAC and PHY layer operations, such as segmentation and TSN generation on the packets before transmission to the WTRU. Existing MAC and PHY layer procedures at the WTRU will not be able to process and reconstruct packets in sequence since they are originating from two Node-Bs. The MAC DC-HSDPA architecture in the WTRU is not designed to receive data from different sites. Additionally, reception from different sites may increase and introduce the possibility of out-of-order reception, causing potential data dropping in the MAC-ehs entities and premature RLC status reporting in the RLC entities. Methods to allow inter-site operation and reordering in several layers are required.

SUMMARY

A method for use in a wireless transmit receive unit (WTRU) for two-stage reordering of received protocol data units (PDUs). The method comprises receiving PDUs from a plurality of Node-Bs, wherein each of the received PDUs has a transmission sequence number (TSN), reordering the received PDUs from each of the plurality of Node-Bs using the TSN in a MAC layer in different reordering queues, delivering the received PDUs from a plurality of reordering queues to one logical channel in the RLC layer, reordering the received PDUs in the RLC layer based on a sequence number (SN), starting a timer when at least a RLC PDU is missing based on SN of the RLC PDU, and transmitting a status report indicating a missing RLC PDU based on SN of the RLC PDU on a condition that the timer expires, wherein transmission of the status report is delayed on a condition that a RLC PDU is missing based on SN of the RLC PDU and the timer is running.

BRIEF DESCRIPTION OF THE DRAWINGS

A more detailed understanding may be had from the following description, given by way of example in conjunction with the accompanying drawings wherein:

FIG. 1C is a system diagram of an example radio access network and an example core network that may be used within the communications system illustrated in FIG. 1A;

DETAILED DESCRIPTION

Figure 1A:
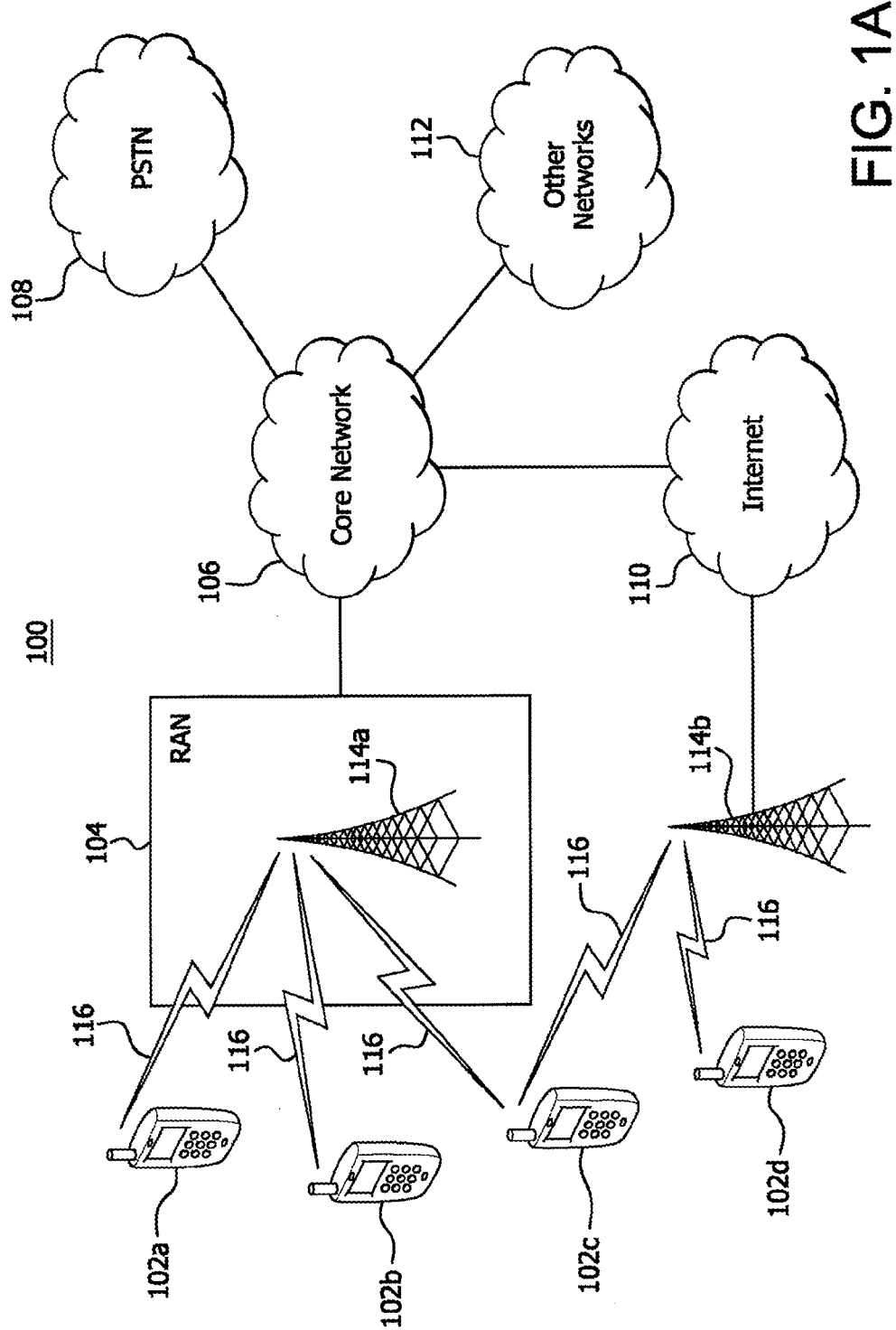
FIG. 1A is a system diagram of an example communications system in which one or more disclosed embodiments may be implemented.

FIG. 1A is a diagram of an example communications system 100 in which one or more disclosed embodiments may be implemented. The communications system 100 may be a multiple access system that provides content, such as voice, data, video, messaging, broadcast, etc., to multiple wireless users. The communications system 100 may enable multiple wireless users to access such content through the sharing of system resources, including wireless bandwidth. For example, the communications systems 100 may employ one or more channel access methods, such as code division multiple access (CDMA), time division multiple access (TDMA), frequency division multiple access (FDMA), orthogonal FDMA (OFDMA), single-carrier FDMA (SC-FDMA), and the like.

As shown in FIG. 1A, the communications system 100 may include wireless transmit/receive units (WTRUs) 102a, 102b, 102c, 102d, a radio access network (RAN) 104, a core network 106, a public switched telephone network (PSTN) 108, the Internet 110, and other networks 112, though it will be appreciated that the disclosed embodiments contemplate any number of WTRUs, base stations, networks, and/or network elements. Each of the WTRUs 102a, 102b, 102c, 102d may be any type of device configured to operate and/or communicate in a wireless environment. By way of example, the WTRUs 102a, 102b, 102c, 102d may be configured to transmit and/or receive wireless signals and may include user equipment (UE), a mobile station, a fixed or mobile subscriber unit, a pager, a cellular telephone, a personal digital assistant (PDA), a smartphone, a laptop, a netbook, a personal computer, a wireless sensor, consumer electronics, and the like.

The communications systems 100 may also include a base station 114a and a base station 114b. Each of the base stations 114a, 114b may be any type of device configured to wirelessly interface with at least one of the WTRUs 102a, 102b, 102c, 102d to facilitate access to one or more communication networks, such as the core network 106, the Internet 110, and/or the networks 112. By way of example, the base stations 114a, 114b may be a base transceiver station (BTS), a Node-B, an eNode B, a Home Node B, a Home eNode B, a site controller, an access point (AP), a wireless router, and the like. While the base stations 114a, 114b are each depicted as a single element, it will be appreciated that the base stations 114a, 114b may include any number of interconnected base stations and/or network elements.

The base station 114a may be part of the RAN 104, which may also include other base stations and/or network elements (not shown), such as a base station controller (BSC), a radio network controller (RNC), relay nodes, etc. The base station 114a and/or the base station 114b may be configured to transmit and/or receive wireless signals within a particular geographic region, which may be referred to as a cell (not shown). The cell may further be divided into cell sectors. For example, the cell associated with the base station 114a may be divided into three sectors. Thus, in one embodiment, the base station 114a may include three transceivers, i.e., one for each sector of the cell. In another embodiment, the base station 114a may employ multiple-input multiple output (MIMO) technology and, therefore, may utilize multiple transceivers for each sector of the cell.

The base stations 114a, 114b may communicate with one or more of the WTRUs 102a, 102b, 102c, 102d over an air interface 116, which may be any suitable wireless communication link (e.g., radio frequency (RF), microwave, infrared (IR), ultraviolet (UV), visible light, etc.). The air interface 116 may be established using any suitable radio access technology (RAT).

More specifically, as noted above, the communications system 100 may be a multiple access system and may employ one or more channel access schemes, such as CDMA, TDMA, FDMA, OFDMA, SC-FDMA, and the like. For example, the base station 114a in the RAN 104 and the WTRUs 102a, 102b, 102c may implement a radio technology such as Universal Mobile Telecommunications System (UMTS) Terrestrial Radio Access (UTRA), which may establish the air interface 116 using wideband CDMA (WCDMA). WCDMA may include communication protocols such as High-Speed Packet Access (HSPA) and/or Evolved HSPA (HSPA+). HSPA may include High-Speed Downlink Packet Access (HSDPA) and/or High-Speed Uplink Packet Access (HSUPA).

In another embodiment, the base station 114a and the WTRUs 102a, 102b, 102c may implement a radio technology such as Evolved UMTS Terrestrial Radio Access (E-UTRA), which may establish the air interface 116 using Long Term Evolution (LTE) and/or LTE-Advanced (LTE-A).

In other embodiments, the base station 114a and the WTRUs 102a, 102b, 102c may implement radio technologies such as IEEE 802.16 (i.e., Worldwide Interoperability for Microwave Access (WiMAX)), CDMA2000, CDMA2000 1X, CDMA2000 EV-DO, Interim Standard 2000 (IS-2000), Interim Standard 95 (IS-95), Interim Standard 856 (IS-856), Global System for Mobile communications (GSM), Enhanced Data rates for GSM Evolution (EDGE), GSM EDGE (GERAN), and the like.

The base station 114b in FIG. 1A may be a wireless router, Home Node B, Home eNode B, or access point, for example, and may utilize any suitable RAT for facilitating wireless connectivity in a localized area, such as a place of business, a home, a vehicle, a campus, and the like. In one embodiment, the base station 114b and the WTRUs 102c, 102d may implement a radio technology such as IEEE 802.11 to establish a wireless local area network (WLAN). In another embodiment, the base station 114b and the WTRUs 102c, 102d may implement a radio technology such as IEEE 802.15 to establish a wireless personal area network (WPAN). In yet another embodiment, the base station 114b and the WTRUs 102c, 102d may utilize a cellular-based RAT (e.g., WCDMA, CDMA2000, GSM, LTE, LTE-A, etc.) to establish a picocell or femtocell. As shown in FIG. 1A, the base station 114b may have a direct connection to the Internet 110. Thus, the base station 114b may not be required to access the Internet 110 via the core network 106.

The RAN 104 may be in communication with the core network 106, which may be any type of network configured to provide voice, data, applications, and/or voice over internet protocol (VoIP) services to one or more of the WTRUs 102a, 102b, 102c, 102d. For example, the core network 106 may provide call control, billing services, mobile location-based services, pre-paid calling, Internet connectivity, video distribution, etc., and/or perform high-level security functions, such as user authentication. Although not shown in FIG. 1A, it will be appreciated that the RAN 104 and/or the core network 106 may be in direct or indirect communication with other RANs that employ the same RAT as the RAN 104 or a different RAT. For example, in addition to being connected to the RAN 104, which may be utilizing an E-UTRA radio technology, the core network 106 may also be in communication with another RAN (not shown) employing a GSM radio technology.

The core network 106 may also serve as a gateway for the WTRUs 102a, 102b, 102c, 102d to access the PSTN 108, the Internet 110, and/or other networks 112. The PSTN 108 may include circuit-switched telephone networks that provide plain old telephone service (POTS). The Internet 110 may include a global system of interconnected computer networks and devices that use common communication protocols, such as the transmission control protocol (TCP), user datagram protocol (UDP) and the internet protocol (IP) in the TCP/IP internet protocol suite. The networks 112 may include wired or wireless communications networks owned and/or operated by other service providers. For example, the networks 112 may include another core network connected to one or more RANs, which may employ the same RAT as the RAN 104 or a different RAT.

Some or all of the WTRUs 102a, 102b, 102c, 102d in the communications system 100 may include multi-mode capabilities, i.e., the WTRUs 102a, 102b, 102c, 102d may include multiple transceivers for communicating with different wireless networks over different wireless links. For example, the WTRU 102c shown in FIG. 1A may be configured to communicate with the base station 114a, which may employ a cellular-based radio technology, and with the base station 114b, which may employ an IEEE 802 radio technology.

Figure 1B:
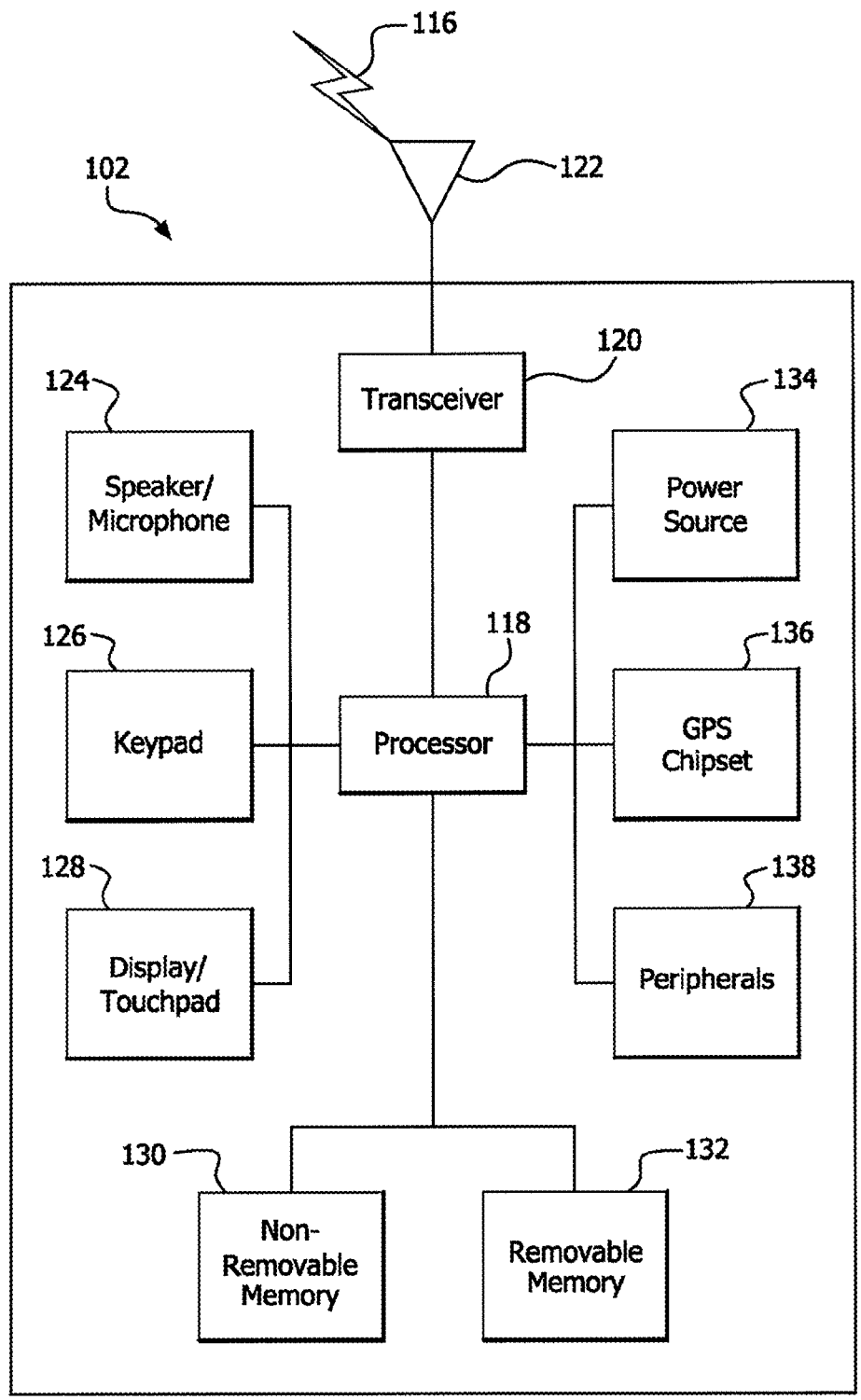
FIG. 1B is a system diagram of an example wireless transmit/receive unit (WTRU) that may be used within the communications system illustrated in FIG. 1A.

FIG. 1B is a system diagram of an example WTRU 102. As shown in FIG. 1B, the WTRU 102 may include a processor 118, a transceiver 120, a transmit/receive element 122, a speaker/microphone 124, a keypad 126, a display/touchpad 128, non-removable memory 106, removable memory 132, a power source 134, a global positioning system (GPS) chipset 136, and other peripherals 138. It will be appreciated that the WTRU 102 may include any sub-combination of the foregoing elements while remaining consistent with an embodiment.

The processor 118 may be a general purpose processor, a special purpose processor, a conventional processor, a digital signal processor (DSP), a plurality of microprocessors, one or more microprocessors in association with a DSP core, a controller, a microcontroller, Application Specific Integrated Circuits (ASICs), Field Programmable Gate Array (FPGAs) circuits, any other type of integrated circuit (IC), a state machine, and the like. The processor 118 may perform signal coding, data processing, power control, input/output processing, and/or any other functionality that enables the WTRU 102 to operate in a wireless environment. The processor 118 may be coupled to the transceiver 120, which may be coupled to the transmit/receive element 122. While FIG. 1B depicts the processor 118 and the transceiver 120 as separate components, it will be appreciated that the processor 118 and the transceiver 120 may be integrated together in an electronic package or chip.

The transmit/receive element 122 may be configured to transmit signals to, or receive signals from, a base station (e.g., the base station 114a) the air interface 116. For example, in one embodiment, the transmit/receive element 122 may be an antenna configured to transmit and/or receive RF signals. In another embodiment, the transmit/receive element 122 may be an emitter/detector configured to transmit and/or receive IR, UV, or visible light signals, for example. In yet another embodiment, the transmit/receive element 122 may be configured to transmit and receive both RF and light signals. It will be appreciated that the transmit/receive element 122 may be configured to transmit and/or receive any combination of wireless signals.

In addition, although the transmit/receive element 122 is depicted in FIG. 1B as a single element, the WTRU 102 may include any number of transmit/receive elements 122. More specifically, the WTRU 102 may employ MIMO technology. Thus, in one embodiment, the WTRU 102 may include two or more transmit/receive elements 122 (e.g., multiple antennas) for transmitting and receiving wireless signals over the air interface 116.

The transceiver 120 may be configured to modulate the signals that are to be transmitted by the transmit/receive element 122 and to demodulate the signals that are received by the transmit/receive element 122. As noted above, the WTRU 102 may have multi-mode capabilities. Thus, the transceiver 120 may include multiple transceivers for enabling the WTRU 102 to communicate via multiple RATs, such as UTRA and IEEE 802.11, for example.

The processor 118 of the WTRU 102 may be coupled to, and may receive user input data from, the speaker/microphone 124, the keypad 126, and/or the display/touchpad 128 (e.g., a liquid crystal display (LCD) display unit or organic light-emitting diode (OLED) display unit). The processor 118 may also output user data to the speaker/microphone 124, the keypad 126, and/or the display/touchpad 128. In addition, the processor 118 may access information from, and store data in, any type of suitable memory, such as the non-removable memory 106 and/or the removable memory 132. The non-removable memory 106 may include random-access memory (RAM), read-only memory (ROM), a hard disk, or any other type of memory storage device. The removable memory 132 may include a subscriber identity module (SIM) card, a memory stick, a secure digital (SD) memory card, and the like. In other embodiments, the processor 118 may access information from, and store data in, memory that is not physically located on the WTRU 102, such as on a server or a home computer (not shown).

The processor 118 may receive power from the power source 134, and may be configured to distribute and/or control the power to the other components in the WTRU 102. The power source 134 may be any suitable device for powering the WTRU 102. For example, the power source 134 may include one or more dry cell batteries (e.g., nickel-cadmium (NiCd), nickel-zinc (NiZn), nickel metal hydride (NiMH), lithium-ion (Li-ion), etc.), solar cells, fuel cells, and the like.

The processor 118 may also be coupled to the GPS chipset 136, which may be configured to provide location information (e.g., longitude and latitude) regarding the current location of the WTRU 102. In addition to, or in lieu of, the information from the GPS chipset 136, the WTRU 102 may receive location information over the air interface 116 from a base station (e.g., base stations 114a, 114b) and/or determine its location based on the timing of the signals being received from two or more nearby base stations. It will be appreciated that the WTRU 102 may acquire location information by way of any suitable location-determination method while remaining consistent with an embodiment.

The processor 118 may further be coupled to other peripherals 138, which may include one or more software and/or hardware modules that provide additional features, functionality and/or wired or wireless connectivity. For example, the peripherals 138 may include an accelerometer, an e-compass, a satellite transceiver, a digital camera (for photographs or video), a universal serial bus (USB) port, a vibration device, a television transceiver, a hands free headset, a Bluetooth® module, a frequency modulated (FM) radio unit, a digital music player, a media player, a video game player module, an Internet browser, and the like.

FIG. 1C is a system diagram of the RAN 104 and the core network 106 according to an embodiment. As noted above, the RAN 104 may employ a UTRA radio technology to communicate with the WTRUs 102a, 102b, 102c over the air interface 116. The RAN 104 may also be in communication with the core network 106. As shown in FIG. 1C, the RAN 104 may include Node-Bs 140a, 140b, 140c, which may each include one or more transceivers for communicating with the WTRUs 102a, 102b, 102c over the air interface 116. The Node-Bs 140a, 140b, 140c may each be associated with a particular cell (not shown) within the RAN 104. The RAN 104 may also include RNCs 142a, 142b. It will be appreciated that the RAN 104 may include any number of Node-Bs and RNCs while remaining consistent with an embodiment.

As shown in FIG. 1C, the Node-Bs 140a, 140b may be in communication with the RNC 142a. Additionally, the Node-B 140c may be in communication with the RNC 142b. The Node-Bs 140a, 140b, 140c may communicate with the respective RNCs 142a, 142b via an Iub interface. The RNCs 142a, 142b may be in communication with one another via an Iur interface. Each of the RNCs 142a, 142b may be configured to control the respective Node-Bs 140a, 140b, 140c to which it is connected. In addition, each of the RNCs 142a, 142b may be configured to carry out or support other functionality, such as outer loop power control, load control, admission control, packet scheduling, handover control, macrodiversity, security functions, data encryption, and the like.

The core network 106 shown in FIG. 1C may include a media gateway (MGW) 144, a mobile switching center (MSC) 146, a serving GPRS support node (SGSN) 148, and/or a gateway GPRS support node (GGSN) 150. While each of the foregoing elements are depicted as part of the core network 106, it will be appreciated that any one of these elements may be owned and/or operated by an entity other than the core network operator.

The RNC 142a in the RAN 104 may be connected to the MSC 146 in the core network 106 via an IuCS interface. The MSC 146 may be connected to the MGW 144. The MSC 146 and the MGW 144 may provide the WTRUs 102a, 102b, 102c with access to circuit-switched networks, such as the PSTN 108, to facilitate communications between the WTRUs 102a, 102b, 102c and traditional land-line communications devices.

The RNC 142a in the RAN 104 may also be connected to the SGSN 148 in the core network 106 via an IuPS interface. The SGSN 148 may be connected to the GGSN 150. The SGSN 148 and the GGSN 150 may provide the WTRUs 102a, 102b, 102c with access to packet-switched networks, such as the Internet 110, to facilitate communications between and the WTRUs 102a, 102b, 102c and IP-enabled devices.

As noted above, the core network 106 may also be connected to the networks 112, which may include other wired or wireless networks that are owned and/or operated by other service providers.

A two-stage reordering procedure may be used to allow a WTRU to process and reconstruct packets transmitted from two or more Node-Bs. The two-stage reordering procedure ensures in-order delivery packets to higher layers by creating multiple MAC-ehs entities in the WTRU, one per Node-B. The two-stage reordering procedure performs reordering of the packets in a new MAC entity only. The two-stage reordering procedure also creates multiple MAC-ehs entities in the WTRU and performs reordering of the packets in the MAC and RLC. A single stage reordering of packets may also be used to ensure in-order delivery of packets to higher layers by distributing logical channels between Node-Bs to allow a WTRU to process and reconstruct packets transmitted from two or more Node-Bs.

The term MAC-ehs may be used to represent the functionality performed in a Release 7 MAC-ehs sub-layer operating on an HS-DSCH transport channel, including, but not limited to: Hybrid Automatic Repeat Request (HARQ), disassembly, reordering queue distribution, reordering, reassembly, and Logical Channel ID Demultiplexing (LCH-ID Demux).

For inter-site operation, a new MAC architecture may be established. In one alternative, there may be a plurality of MAC-ehs entities. For example, there may be a MAC-ehs entity for each site configured to perform HSDPA operation in the WTRU. For example, there may be a MAC-ehs entity for each Node B performing multipoint operation. The data is therefore split at the MAC level and one RLC entity exists per WTRU.

For intra-site operations, for example, cells belonging to the same Node-B, there may be only one MAC-ehs entity in the WTRU. For an inter-site scenario, for example, cells belonging to different Node-Bs, there may be one MAC-ehs entity per Node-B in the WTRU. If the WTRU is configured for multiple cell reception, there may be an indicator transmitted by the network telling the WTRU whether the configuration is intra-site, inter-site, or a combination of both, so that the WTRU may determine how many MAC-ehs entities are required. This indicator may be a simple Boolean, (for example, intra-site or inter-site indication), may be the explicit number and parameters of MAC-ehs entities that the WTRU is configured with, or may be a mapping between cells and Node-Bs (for example, cells 1 and 2 may belong to NodeB1, cell 3 may belong to NodeB2, etc.).

Other signaling mechanisms, such as the transmit power control (TPC) combination index or the relative grant (RG) combination index, may be used by the WTRU to determine whether a separate MAC-ehs entity is available. The WTRU's functionality may also be established for a particular Node B. More specifically, if the WTRU is receiving HS-DSCH from cells that have equal indexes, then the WTRU may determine that the cells belong to the same Node B and therefore may only have one MAC-ehs entity or one set of priority queues for those cells. Otherwise, if the indexes are different, the WTRU may assume that for each HS-DSCH cell configured with a different index, there should be a MAC-ehs entity. Some Node B implementations may not allow sharing of resources between the sectors, in which case it may be assumed that for each cell within this type of Node B, a MAC-ehs entity per WTRU may be configured.

On the network side, each Node B may maintain one MAC-ehs entity for each WTRU and packets may be assigned transmit sequence numbers (TSN) independently at each Node-B. Each Node B may also maintain one MAC-ehs entity per cell for each WTRU or alternatively each Node B may maintain one MAC-ehs entity for all configured cells for the WTRU within that site.

Figure 2:
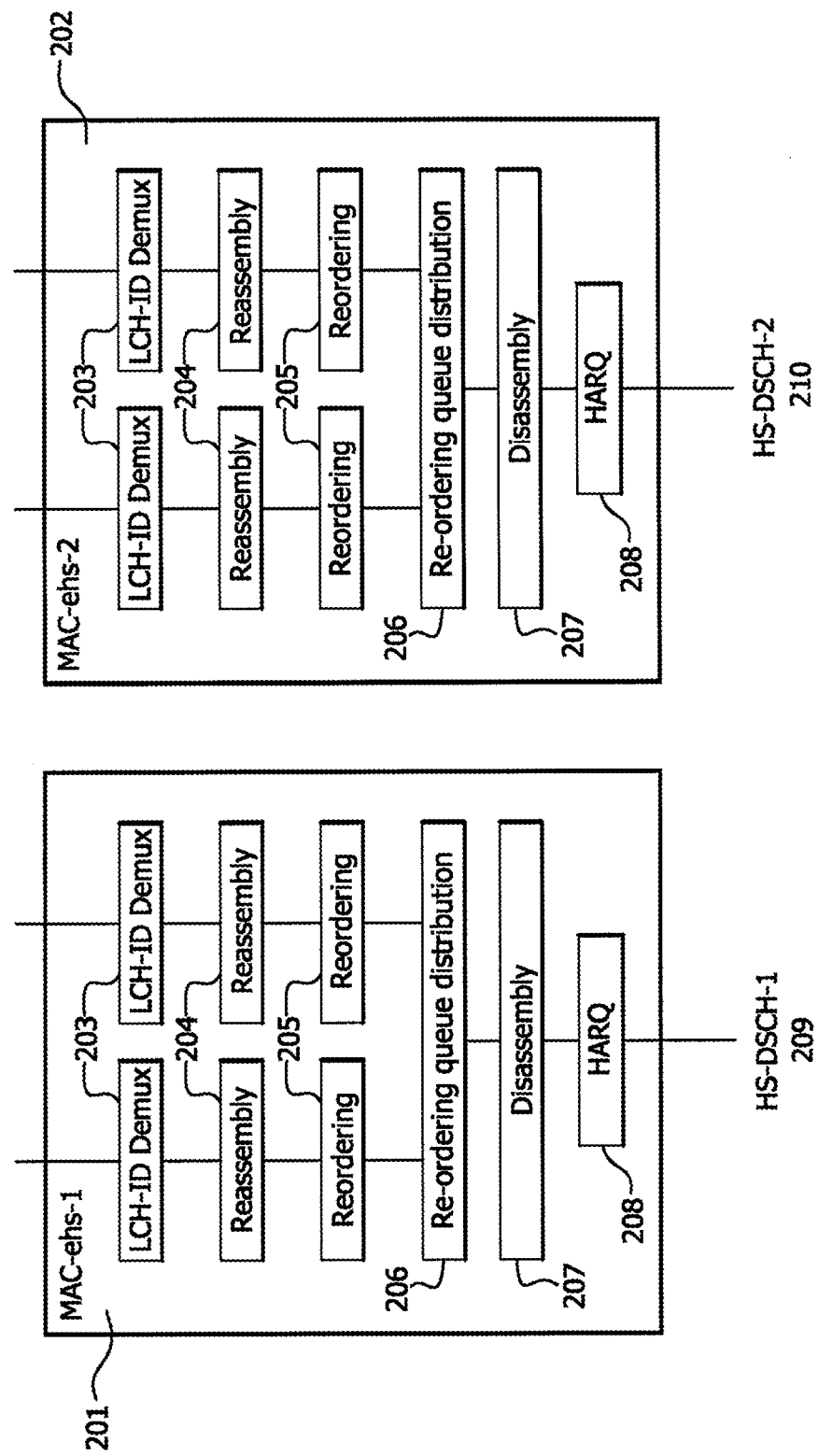
FIG. 2 shows an example of a MAC architecture for a WTRU having duplicate MAC-ehs entities.

FIG. 2 shows an example of a MAC architecture for a WTRU having duplicate MAC-ehs entities. As shown in FIG. 2, the MAC architecture contains duplicate MAC-ehs entities where complete MAC-ehs functionalities may be replicated. This may lead to having different HARQ entities for each MAC-ehs entity and it may be assumed that the WTRU is configured to receive data from two different cells. The architecture shown in FIG. 2 may be expanded for the cases where the WTRU may receive an HS-DSCH channel from more than two Node Bs. In FIG. 2, MAC-ehs-1 201 may be established for reception of HS-DSCH 210 from Node B1 and MAC-ehs-2 202 may be established for reception of HS-DSCH 211 from Node B2. The MAC-ehs-1 201 and MAC-ehs-2 202 may further include a LCH-ID Demux entity 203, a reassembly entity 204, a reordering entity 205, a re-ordering queue distribution 206, a disassembly entity 207, and a HARQ entity 208.

The LCH-ID Demux entity 203 may be used to route the MAC-ehs Service Data Units (SDUs) to a correct logical channel based on the received logical channel identifier. The reassembly entity 204 may be used to reassemble segmented MAC-ehs SDUs and forward the MAC Protocol Data Units (PDUs) to the LCH-ID Demux entity 203. The reordering entity 205 may organize received reordering PDUs according to a received sequence number. The re-ordering queue distribution 206 may route the received reordering PDUs to a correct reordering queue based on the received logical channel identifier. The disassembly entity 207 may disassemble MAC-ehs PDUs by removing the MAC-ehs header. The HARQ entity 208 handles HARQ protocol.

In another example of a MAC architecture for WTRU, only one MAC-ehs entity may be configured with a set of re-ordering queues per cell or per Node-B. The reordering queue distribution may determine which queue the data is transmitted to using one or a combination of the following ways.

A first way to determine which queue the data may be transmitted to is that each HARQ ID process may be mapped to a particular MAC-ehs entity. This may be achieved by having different MAC-ehs entities use different HARQ process IDs ranges. Optionally, a new field (e.g., a MAC-ehs ID) may be configured and used to identify a particular MAC-ehs entity in addition to the HARQ process IDs. The different MAC-ehs entities may continue to use the same HARQ process ID range.

A second way to determine which queue the data may be transmitted to is that each cell or Node-B may have a predefined range of queue distribution IDs that enables the WTRU to discriminate between both. Optionally, a queue ID may be kept per Node B or cell.

A third way to determine which queue the data may be transmitted to is that a mapping between the queue IDs and the MAC-ehs entity may be signaled by the network For example, the network may signal MAC-ehs ID for each queue ID.

A fourth way to determine which queue the data may be transmitted to is that a new identifier in the MAC-ehs Protocol Data Unit (PDU) header may be used to indicate to the WTRU which MAC-ehs entity the MAC-ehs PDU should be delivered.

A fifth way to determine which queue the data may be transmitted to is that the WTRU may use a physical layer identification (for example, the scrambling code of the cell) to determine which MAC-ehs entity the MAC-ehs PDU should be delivered.

A sixth way to determine which queue the data may be transmitted to may be based on the received HS-DSCH channel. A re-ordering queue may be mapped to a HS-DSCH transport channel or HS-DPSCH channel.

A seventh way to determine which queue the data may be transmitted to is that a new Node-B ID indicator may be defined so that the network is able to indicate a mapping between queue ID and Node-B ID to the WTRU. Specifically the new Node-B ID indicator mapping may include which Node-B ID each queue ID is mapped to.

Figure 3:
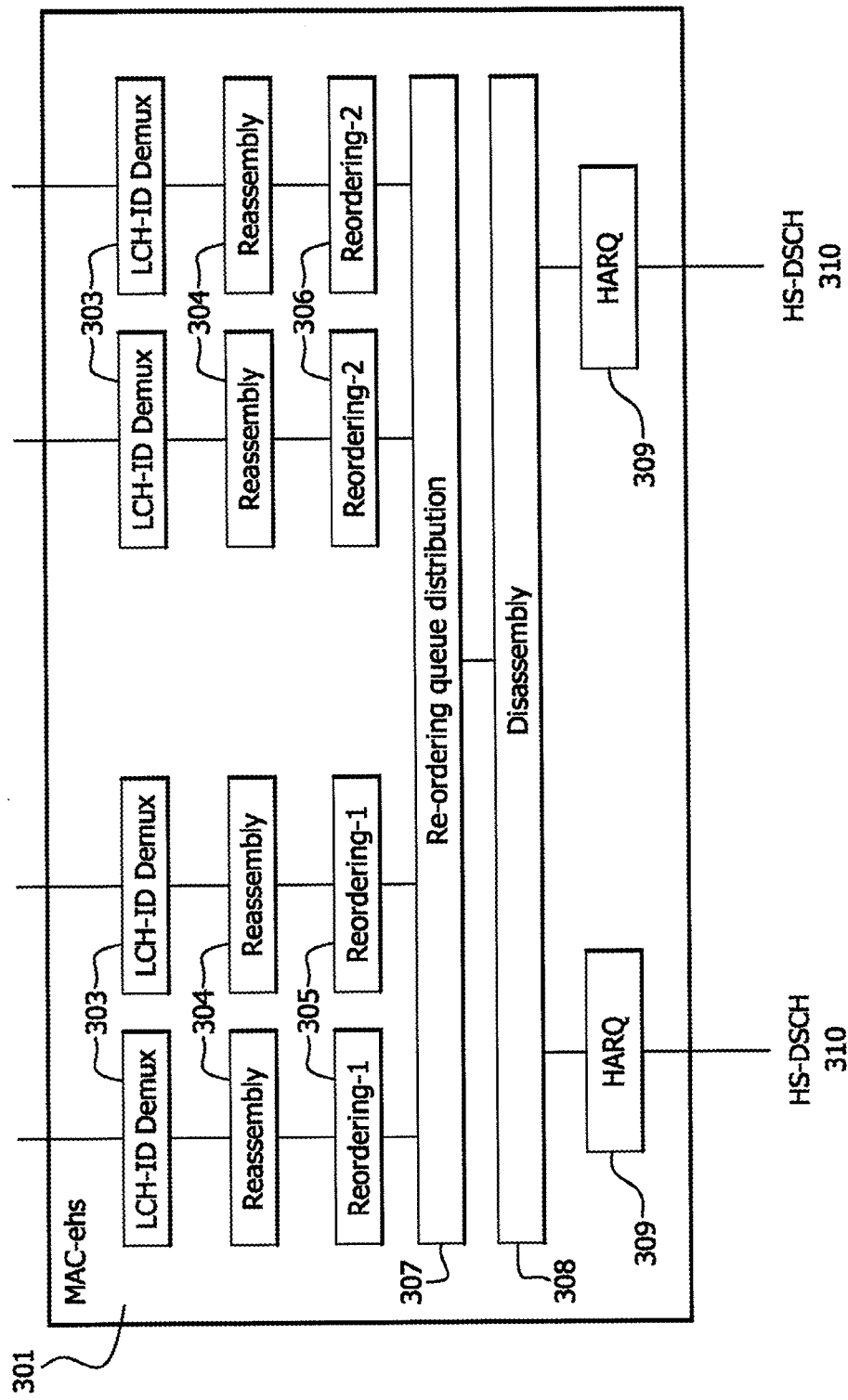
FIG. 3 shows an example MAC-ehs entity and two sets of reordering queues on the WTRU side where each set of reordering queues includes two queues.

FIG. 3 shows an example MAC-ehs entity and two sets of reordering queues on the WTRU side where each set of reordering queues includes two queues. Each MAC-ehs entity or set of reordering entities in the WTRU 300 may be configured to reorder the packets for reordering queues belonging to a particular Node-B. The MAC-ehs entity 301 may include a LCH-ID Demux entity 303, a reassembly entity 304, a reordering-1 entity 305, a reordering-2 entity 306, a re-ordering queue distribution 307, a disassembly entity 308, and a HARQ entity 309.

The LCH-ID Demux entity 303 may be used to route the MAC-ehs SDUs to a correct logical channel based on the received logical channel identifier. The reassembly entity 304 may be used to reassemble segmented MAC-ehs SDUs and forward the MAC PDUs to the LCH-ID Demux entity 303. The reordering-1 entity 305 and reordering-2 entity 306 may organize received reordering PDUs according to a received sequence number. The re-ordering queue distribution 307 may route the received reordering PDUs to a correct reordering queue based on the received logical channel identifier. The disassembly entity 308 may disassemble MAC-ehs PDUs by removing the MAC-ehs header. The HARQ entity 309 handles HARQ protocol.

The reordering of packets received from different Node-Bs, or alternatively cells, may be achieved, for example, in one of the following ways: (1) second-stage reordering performed in the MAC by creating a new MAC entity; or (2) second-stage reordering performed in the RLC.

For second-stage reordering in the MAC layer, the packets delivered by the two MAC-ehs entities or the common MAC-ehs entity may not be in order because the packets from different Node Bs may not necessarily be received at the same time. Because RLC functionality may rely on the MAC-ehs entity to deliver RLC PDUs in order, existing procedures, such as RLC status reporting, may be affected. With a MAC architecture having duplicate MAC-ehs entities, the RLC entity may receive packets out of order, which may trigger premature RLC status reporting from the WTRU side and therefore unnecessary retransmission of data that may not be lost but rather delayed. In order to avoid or to minimize the impact to the RLC entity, the MAC architecture may ensure that packets coming from two Node Bs are properly reordered prior to being transmitted to RLC or higher layer entities in the WTRU. This new MAC functionality may be found in a MAC-sf entity.

Figure 4:
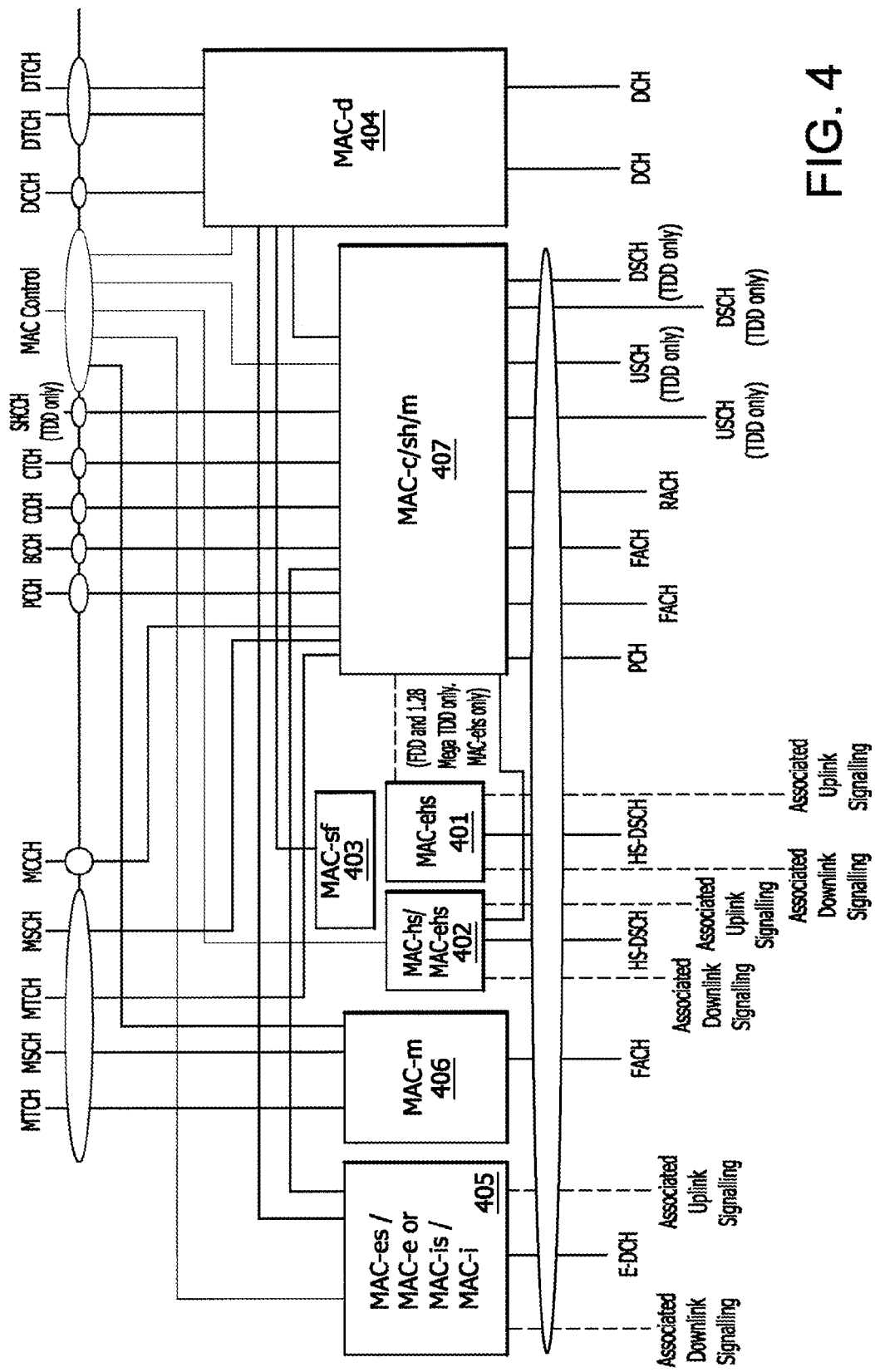
FIG. 4 shows an example of a MAC architecture for a WTRU having duplicate MAC-ehs entities and a MAC-sf entity.

FIG. 4 shows an example of a MAC architecture for a WTRU having duplicate MAC-ehs entities and a MAC-sf entity. Each WTRU may be configured with one MAC-sf entity. The new MAC-sf entity may be found above the one or more MAC-ehs entities or above a common MAC-ehs entity. In the Universal Terrestrial Radio Access Network (UTRAN) there is one MAC-sf entity for each WTRU.

As shown in FIG. 4 a MAC-sf 403 may communicate with MAC-ehs entities 401 or a common MAC-ehs entity 402 and with a MAC-d 404 as shown in FIG. 4.

A MAC-c/sh/m 407 may control access to all common transport channels, except the HS-DSCH transport channel and the E-DCH transport channel. The MAC-d 404 may control access to all dedicated transport channels, to the MAC-c/sh/m 407 and MAC-hs/ehs 401 and 402. The MAC-c/sh/m 407 may also control access to a MAC-is/i 405. MAC-hs/ehs 401 and 402 may also handle HSDPA specific functions and control access to the HS-DSCH transport channel. The MAC-es/e or MAC-is/i 405 may control access to the E-DCH transport channel.

Figure 5:
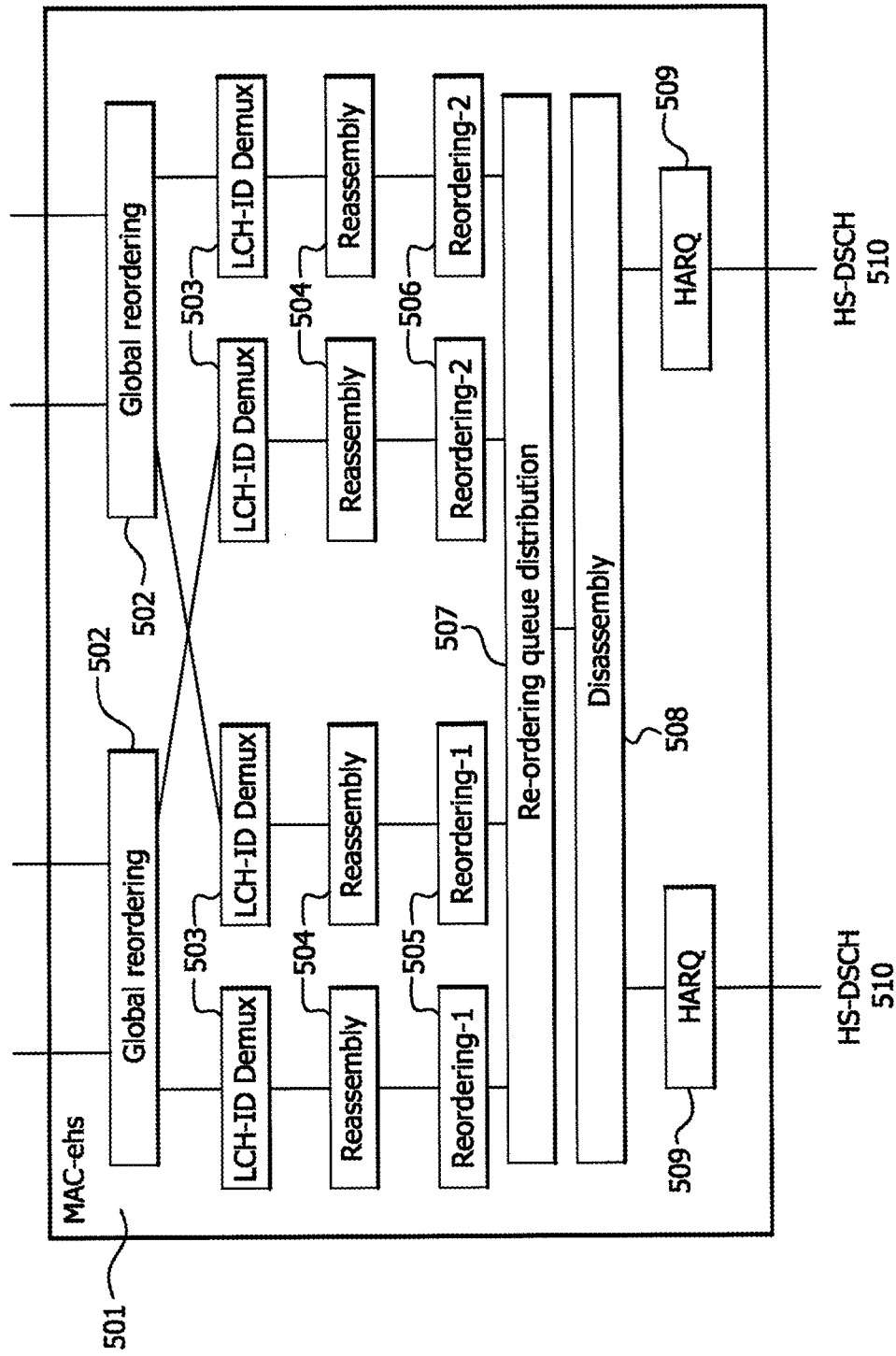
FIG. 5 shows an example of a global MAC-ehs entity in a WTRU having two global reordering sub-entities.

FIG. 5 shows an example of a global MAC-ehs entity in a WTRU having two global reordering sub-entities. All of the MAC-sf functionalities may be merged in a global MAC-ehs entity or a new MAC entity with the MAC-ehs functionalities on the WTRU side. The MAC-sf functionalities may reside in a new sub-entity, which may be called a global reordering entity 502. There may be one global reordering entity 502 per logical channel identity 503. A MAC-ehs entity 501 may include a LCH-ID Demux entity 503, a reassembly entity 504, a reordering-1 entity 505, a reordering-2 entity 506, a re-ordering queue distribution 507, a disassembly entity 508, and a HARQ entity 509. As shown in FIG. 5, there may be two reordering queues per Node-B and each Node-B may use the same two logical channels. The MAC-sf functionalities may also be included in the MAC-d sublayer.

The LCH-ID Demux entity 503 may be used to route the MAC-ehs SDUs to a correct logical channel based on the received logical channel identifier. The reassembly entity 504 may be used to reassemble segmented MAC-ehs SDUs and forward the MAC PDUs to LCH-ID Demux entity 303. The reordering-1 entity 505 and reordering-2 entity 506 may organize received reordering PDUs according to a received sequence number. The re-ordering queue distribution 507 may route the received reordering PDUs to a correct reordering queue based on the received logical channel identifier. The disassembly entity 508 may disassemble MAC-ehs PDUs by removing the MAC-ehs header. The HARQ entity 509 handles HARQ protocol.

Figure 6:
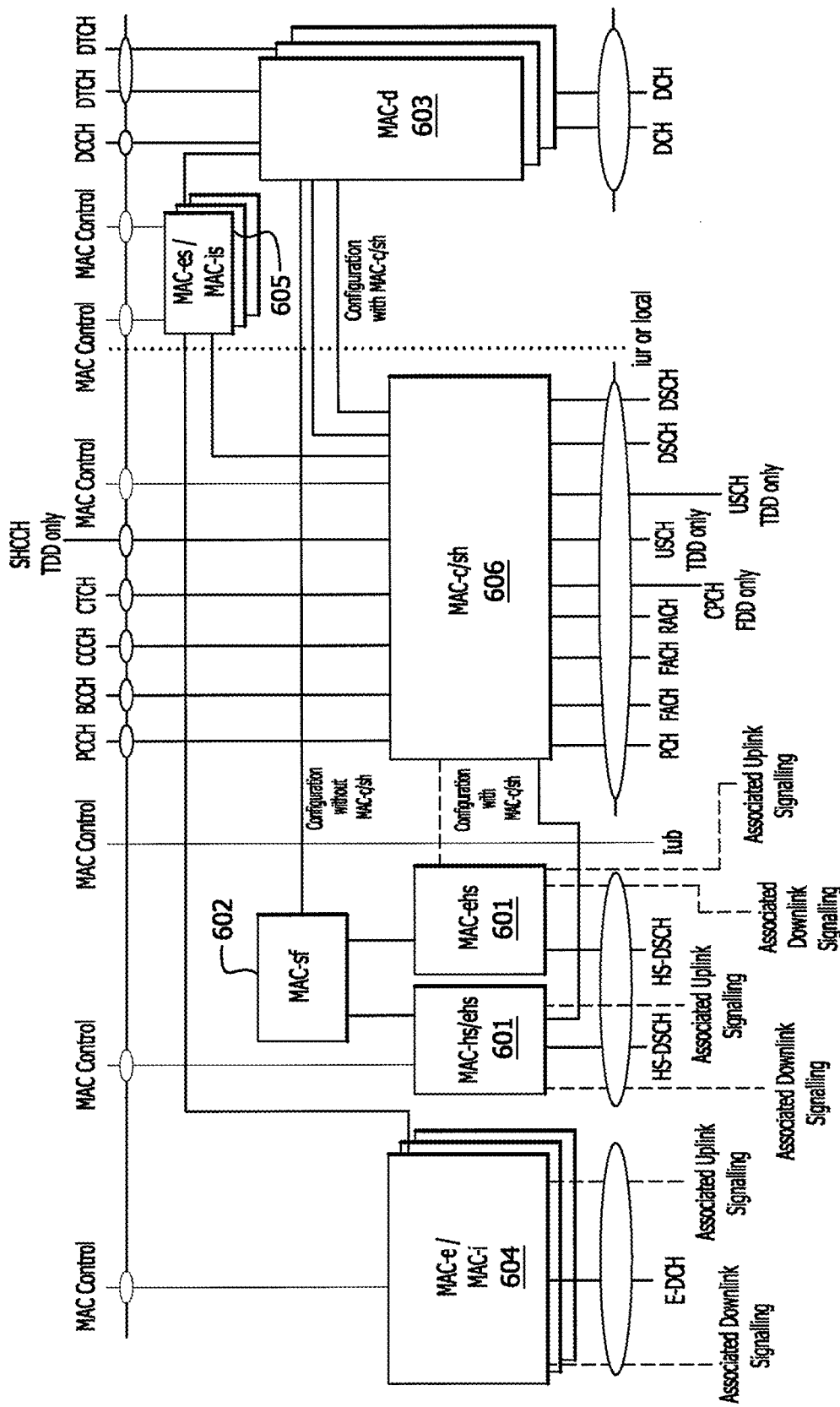
FIG. 6 shows an example of a MAC-sf entity on the UTRAN side.

FIG. 6 shows an example of a MAC-sf entity on the UTRAN side. On the UTRAN side, a new MAC-sf entity 602 may be located in the RNC and may communicate with both MAC-ehs entities 601 in the Node-Bs and with a MAC-d 603 in the RNC. FIG. 6 shows that the new MAC-sf entity 602 may be located in the RNC and may communicate with both MAC-ehs entities 601 in the Node-Bs and with the MAC-d 603 in the RNC.

A MAC-c/sh/m 606 may be located in a controlling RNC while the MAC-d 603 may be located in a serving RNC. MAC-hs/ehs 601 may be located in a Node B. The MAC-d PDUs to be transmitted may be transferred from the MAC-c/h/m 606 to MAC-hs/ehs 601 via Iub interface or from the MAC-d 603 via Iur/Iub.

In the WTRU, each MAC-ehs entity may be configured to deliver the reordered packets per Node-B, or alternatively per cell, to the MAC-sf entity which may reorder them by using the new sequence number $SN_{sf}$ before delivering them to the RLC.

Figure 7:
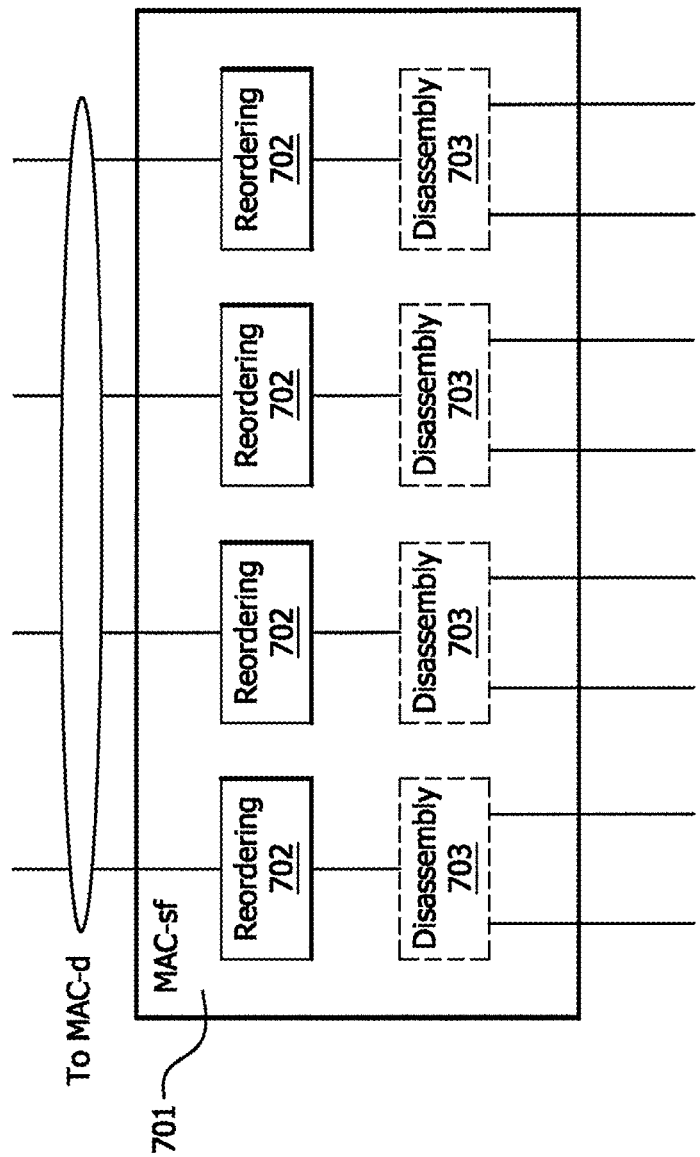
FIG. 7 shows an example of a MAC-sf entity on the WTRU side.

FIG. 7 shows an example of a MAC-sf entity on the WTRU side. The MAC-sf entity may include a disassembly entity and a reordering entity per logical channel identity. In FIG. 7, for example, there are a total of four logical channels that may be assumed. FIG. 7 shows a MAC-sf entity 701 including reordering entities 702 and disassembly entities 703. The reordering entities 702 may organize received reordering PDUs according to a received sequence number. The disassembly entities 703 may disassemble MAC-ehs PDUs by removing the MAC-ehs header.

Figure 8:
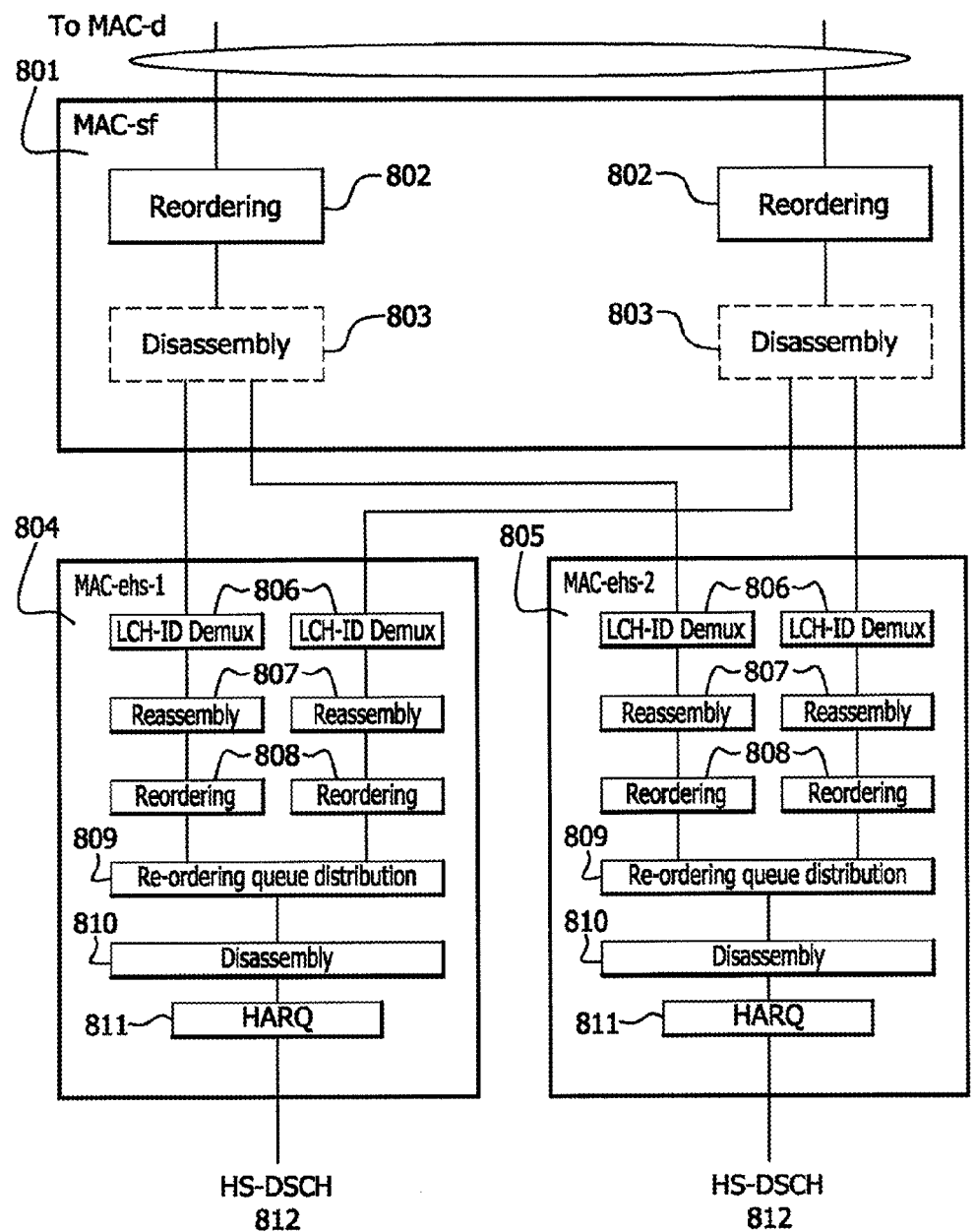
FIG. 8 shows an example of a MAC-sf entity and duplicated MAC-ehs entities on the WTRU side.

FIG. 8 shows an example of a MAC-sf entity and duplicated MAC-ehs entities on the WTRU side. As shown in FIG. 8, a MAC-sf entity 801 may be represented with one of the MAC-ehs entities described above, wherein two separate MAC-ehs entities may coexist. The MAC-sf entity 801 may be located on top of the two MAC-ehs entities 804 and 805 and may receive packets that have been demultiplexed according to the logical channel identity they may be mapped to. The MAC-sf entity 801 may include reordering entities 802 and disassembly entities 803. Each MAC-ehs entity 804 and 805 may include a LCH-ID Demux entity 806, a reassembly entity 807, a reordering 8 entity 08, a re-ordering queue distribution 809, a disassembly entity 810, and a HARQ entity 811.

The reordering entities 802 may organize received reordering PDUs according to a received sequence number. The disassembly 803 may disassemble MAC-ehs PDUs by removing the MAC-ehs header.

The LCH-ID Demux entity 806 may be used to route the MAC-ehs SDUs to a correct logical channel based on the received logical channel identifier. The reassembly entity 807 may be used to reassemble segmented MAC-ehs SDUs and forward the MAC PDUs to the LCH-ID Demux entity 303. The reordering entity 808 may organize received reordering PDUs according to a received sequence number. The re-ordering queue distribution 809 may route the received reordering PDUs to a correct reordering queue based on the received logical channel identifier. The disassembly entity 810 may disassemble MAC-ehs PDUs by removing the MAC-ehs header. The HARQ entity 811 handles HARQ protocol.

Figure 9:
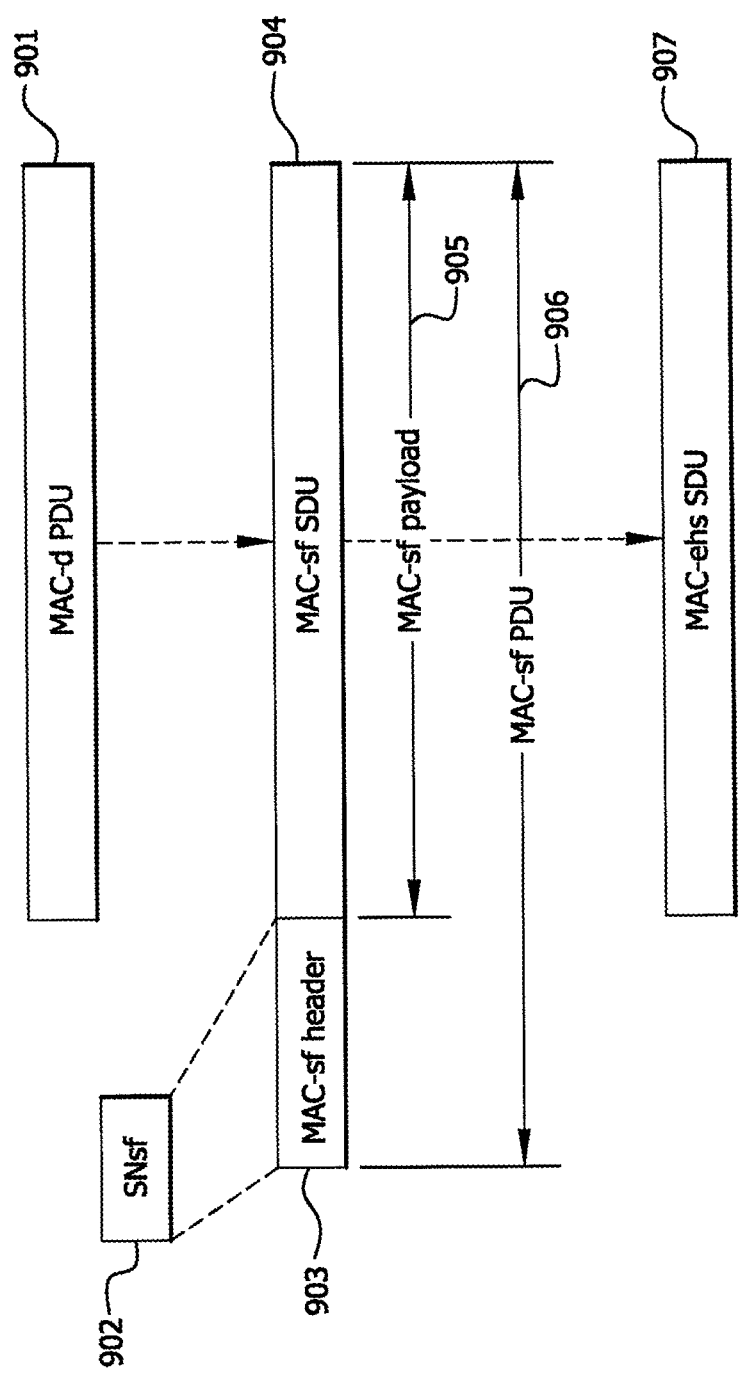
FIG. 9 shows an example MAC-sf PDU.

FIG. 9 shows an example MAC-sf PDU. In FIG. 9, it may be assumed that only two logical channels have been configured and that data for both logical channels may have been transmitted by each Node-B. The packets belonging to the same logical channel may be transmitted to the same disassembly and reordering entity. FIG. 9 serves only as an example and the MAC-sf entity may similarly co-exist with all the other architectures described above.

In the MAC-ehs entity, the existing functionality of the "LCH-ID demultiplexing" may be updated such that the MAC-ehs demultiplexing entity routes the MAC-sf PDUs (for example, the MAC-ehs SDUs) to the correct disassembly and reordering entity of the MAC-sf entity based on the received logical channel identifier. In other words, the MAC-ehs demultiplexing entity may be configured to transmit the MAC-ehs SDUs belonging to the same logical channel to the same disassembly and reordering entity.

In the RNC, a new MAC sequence number $SN_{sf}$ may be added as a header to each MAC-sf PDU to help the MAC-sf entity in the WTRU reorder the packets. The MAC-sf entity in the RNC may be responsible for managing and setting a sequence number per MAC-d flow or per logical channel. Each MAC-d PDU may be given a sequence number. The data may then be transmitted to the MAC-ehs entity of one or more of the configured HS-DSCH Node Bs.

A MAC-sf PDU may be defined with a payload 905 and a header 903. The MAC-sf payload 905 may correspond to one MAC-sf Service Data Unit (SDU) 904 while the header 903 may include the new SF Sequence Number, for example $SN_{sf}$ 902 as shown in FIG. 9. FIG. 9 also shows that on the transmitter side, for example, UTRAN, the MAC-d may transmit a MAC-d PDU to the MAC-sf entity, the MAC-sf entity may receive it as a MAC-sf SDU, and the MAC-sf entity may transmit it to the MAC-ehs entity which may receive it as a MAC-ehs SDU.

On the WTRU side, the MAC-sf disassembly entity may receive the MAC-sf PDUs out of order from the two MAC-ehs entities or from the common MAC-ehs entity. The MAC-sf disassembly entity may remove the MAC-sf header and may deliver the MAC-sf reordering PDU to the MAC-sf reordering entity. There may be one reordering entity per logical channel or per MAC-d flow. Optionally, there may also be one disassembly entity per logical channel. The MAC-sf reordering entity may reorder the packets according to the $SN_{sf}$ included in the header before delivering the packets (for example, the MAC-sf SDUs equivalent to the MAC-d PDUs) to the MAC-d to the correct logical channel.

Additional functionality may be defined for the MAC-sf entity to properly reorder the MAC-sf PDUs. Moreover, the reordering entity may not wait for a missing MAC-sf PDU for an undetermined period of time, because this PDU may be lost or the Node-Bs may be so desynchronized that the delay between packets from one Node-B compared to the packets from the other Node-B may become unacceptable.

Figure 10A:
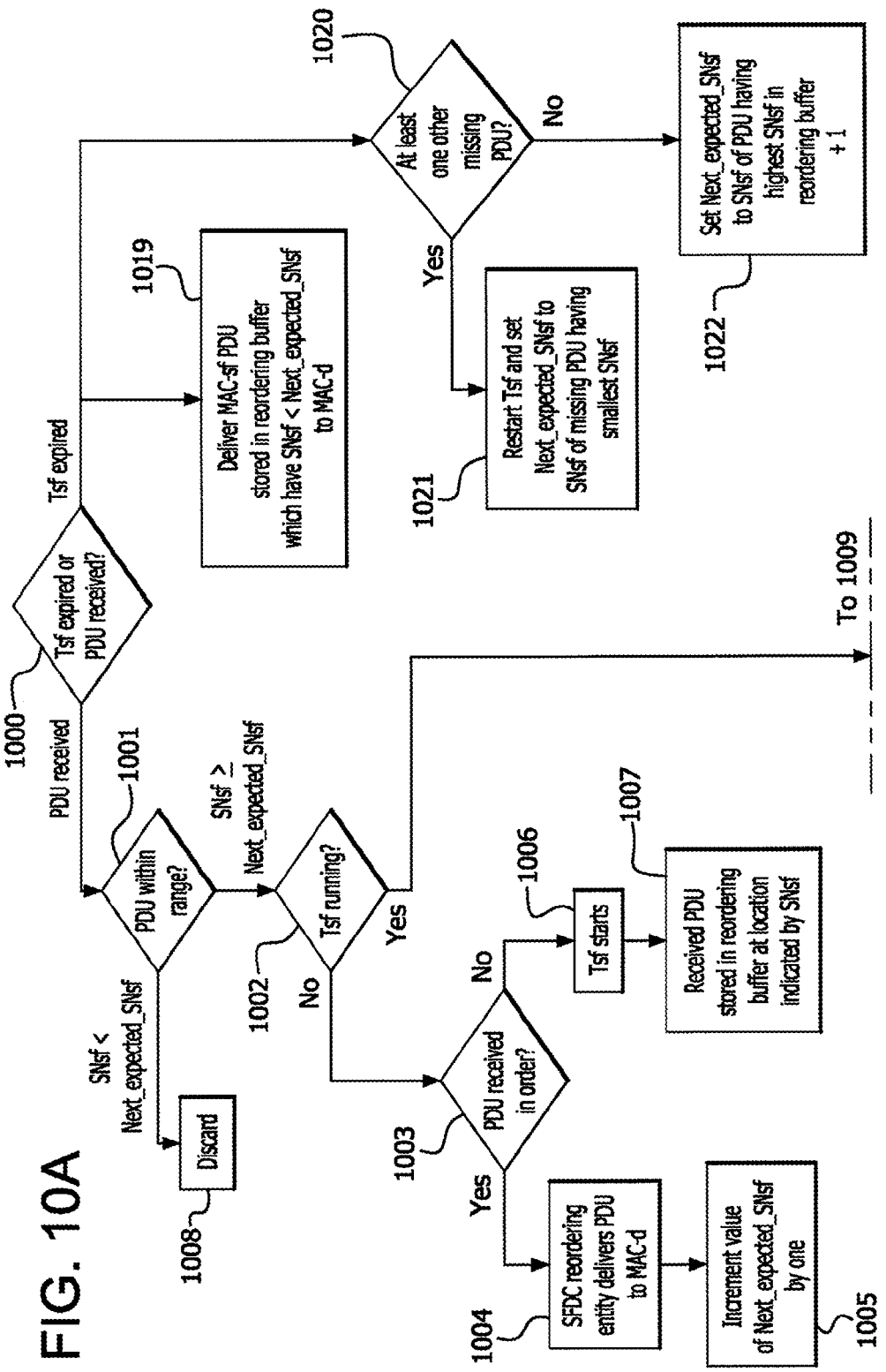
FIGS. 10A and 10B are a flow diagram that shows an alternative embodiment where only one Tsf timer is used at a given time.
Figure 10B:
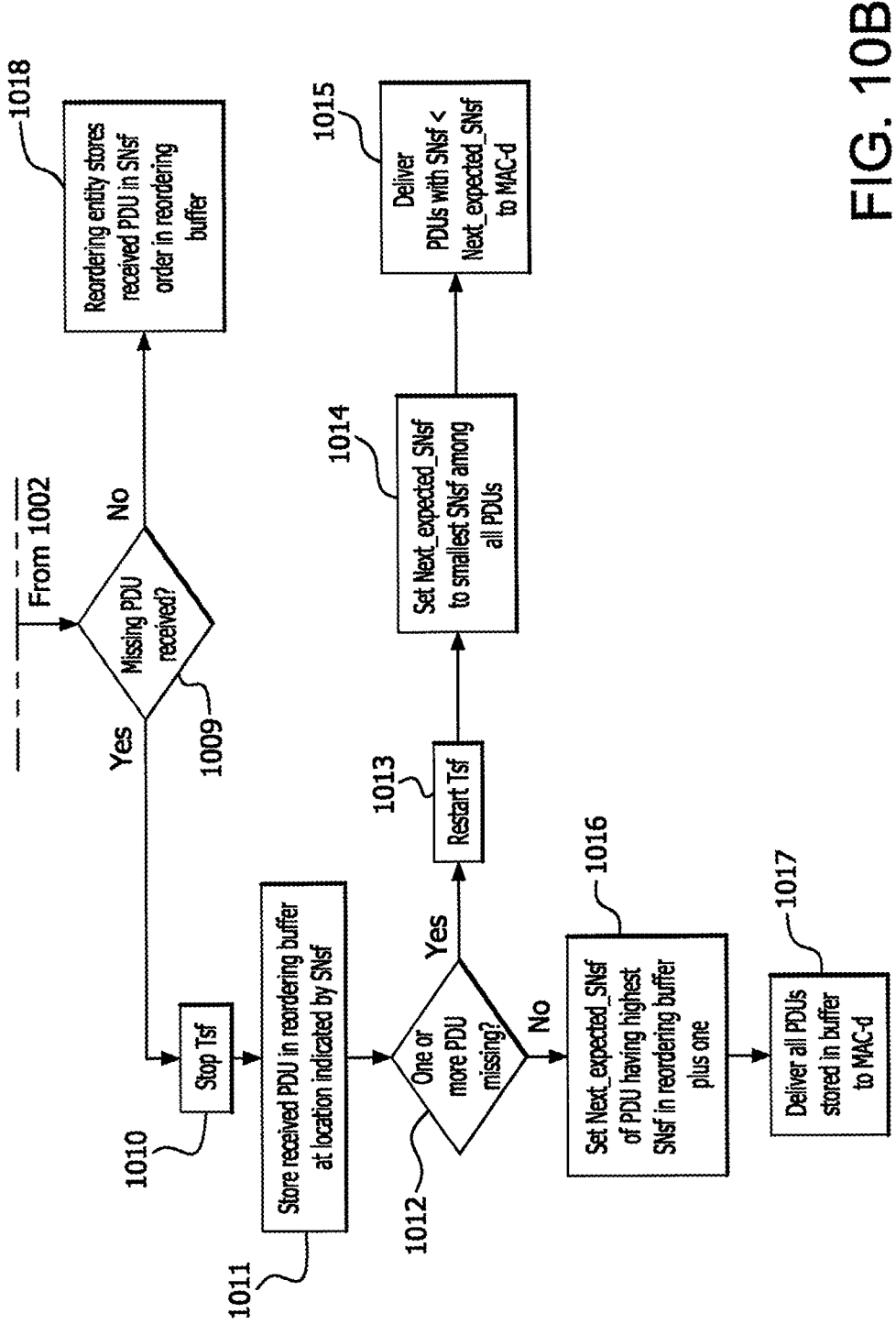

FIGS. 10A and 10B are a flow diagram that shows an alternative embodiment where only one Tsf timer is used at a given time. The following terms are used herein. "Next_expected SNsf" may be the SF-DC sequence number (SNsf) following the SNsf of the last in-sequence MAC-sf PDU received. The initial value of Next_expected_SNsf may be zero. "Tsf" may be the SF-DC missing PDU timer. There may be one timer Tsf running at a given time.

The following describes how the SF-DC reordering entity may use Tsf, Next_expected SNsf and the reordering buffer to reorder the packets that it receives as illustrated in FIGS. 10A and 10B. A determination is made as to whether the Tsf has expired or a PDU is received 1000. If a PDU is received, determine whether the received PDU is within range 1001. If the received PDU is within range, i.e. SNsf≥Next_expected_SNsf, determine if Tsf is running 1002, If Tsf is not running and a MAC-sf PDU is received in order 1003 (SNsf=Next_expected_SNsf), the SF-DC reordering entity may deliver 1004 this PDU to the MAC-d and increment 1005 the value of Next_expected_SNsf by one. If a missing PDU is detected 1003 by the WTRU (a MAC-sf PDU with SNsf>Next_expected SNsf is received) and no timer Tsf is already running Tsf may be started 1006 and the received PDU may be stored 1007 in the reordering buffer at the place indicated by its SNsf.

While Tsf is running 1002, the reordering entity may store the received PDU in their SNsf order in the reordering buffer 1018. If the detected missing PDU is received 1009 in time (the MAC-sf PDU with SNsf=Next_expected SNsf is received before Tsf expires) the timer Tsf may be stopped 1010. The received PDU may be stored 1011 on the reordering buffer at the place indicated by its SNsf. If one or more PDUs are still missing 1012 in the reordering buffer, Tsf may be restarted 1013, Next_expected_SNsf may be set 1014 to the smallest SNsf among all the missing PDUs, and PDUs with SNsf<Next_expected SNsf may be delivered 1015 to the MAC-d. If no PDUs are missing 1012 in the reordering buffer, Next_expected_SNsf may be set 1016 to the SNsf of the PDU having the highest SNsf in the reordering buffer plus one (Next_expected_SNsf=highest SNsf+1) and all of the PDUs stored in the buffer may be delivered 1017 to the MAC-d.

If Tsf expires 1000 if there is at least another missing 1020 PDU in the reordering buffer, Tsf may be restarted and Next_expected SNsf may be set 1021 to the SNsf of the missing PDU having the smallest SNsf. If there is no other missing 1020 PDU in the reordering buffer, Next_expected_SNsf may be set 1022 to the SNsf of the PDU having the highest SNsf in the reordering buffer plus one (Next_expected_SNsf=highest SNsf+1). The MAC-sf PDU which have been stored in the reordering buffer and which have a SNsf<Next_expected SNsf may be delivered 1019 to the MAC-d. If the SF-DC reordering entity receives a PDU 1000 with SNsf<Next_expected_SNsf 1001, it may discard it 1008.

Figure 11A:
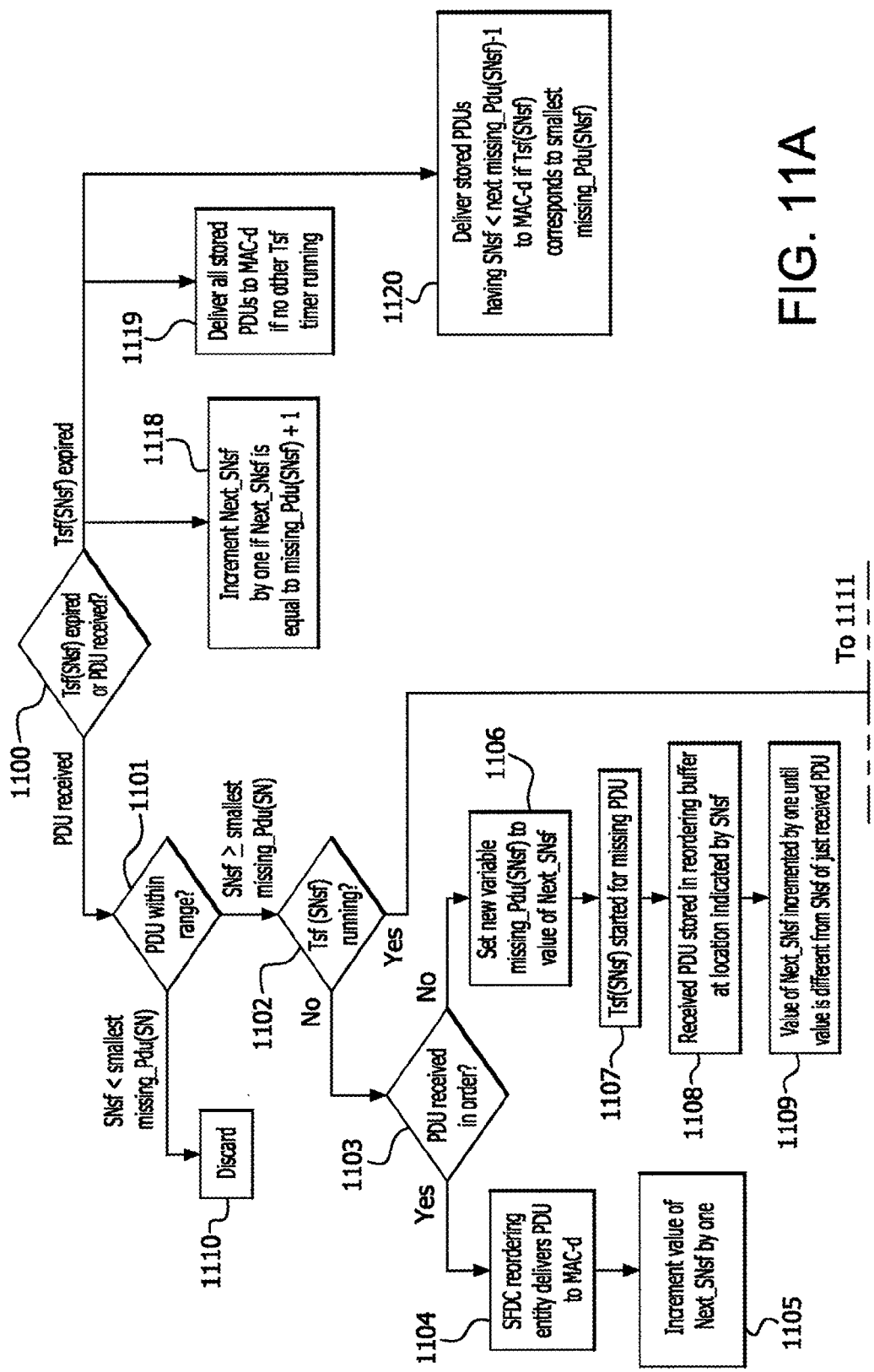
FIGS. 11A and 11B are a flow diagram that shows an alternative embodiment where one timer Tsf is used per missing PDU.
Figure 11B:
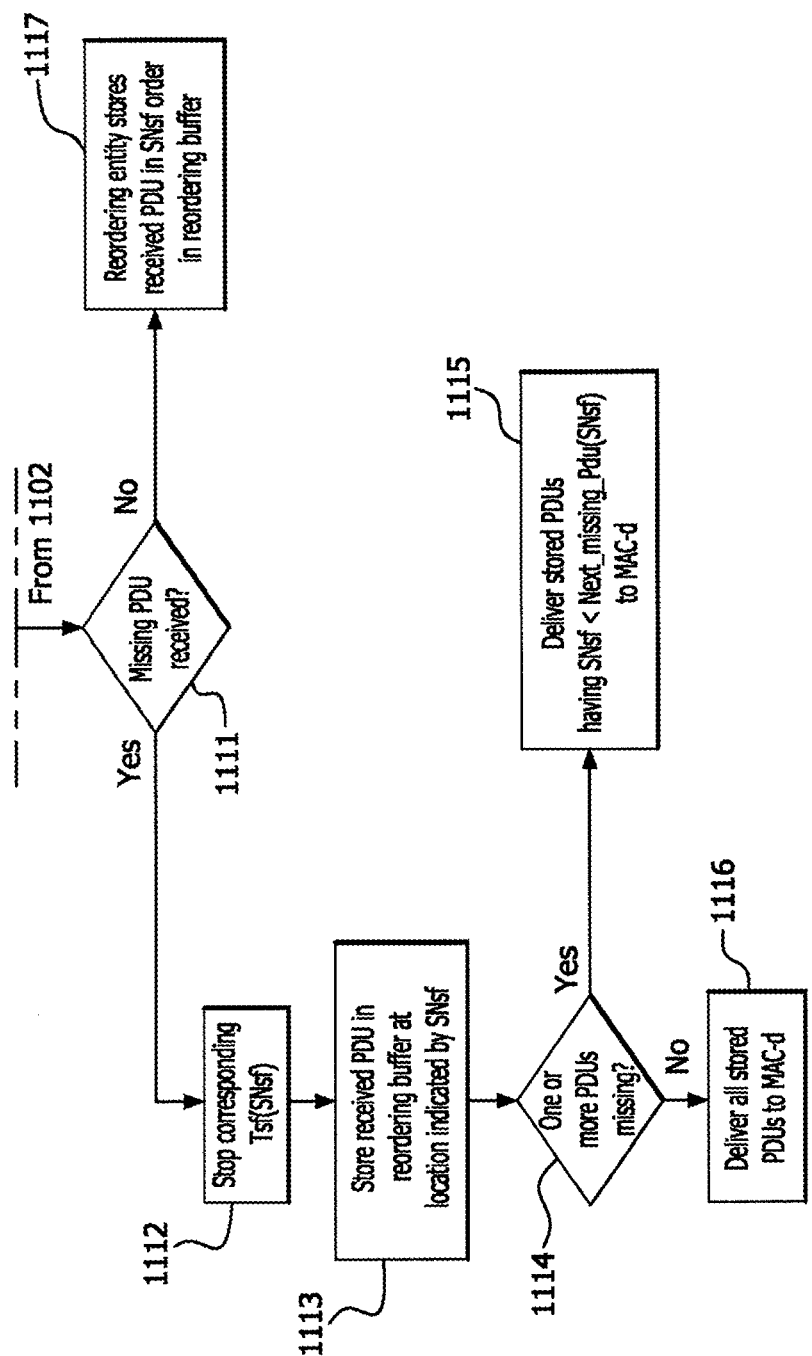

FIGS. 11A and 11B are a flow diagram that shows an alternative embodiment where one timer Tsf is used per missing PDU. The following variables may be defined as follows. "Next_SNsf" may be the SF-DC sequence number (SNsf) following the SNsf of the last MAC-sf PDU received or missing. The initial value of Next_SNsf may be zero. "Tsf(SNsf)" may be the SF-DC missing PDU timer. There may be one timer per missing PDU. "Missing_Pdu(SN)" may be the SN of a missing PDU having sequence number SN. There may be one variable per missing PDU.

The following describes how the SF-DC reordering entity may use the Tsf(SNsf) timers, the different variables, and the reordering buffer to reorder the packets it receives as illustrated in FIGS. 11A and 11B. A determination is made as to whether the Tsf(SNsf) has expired or a PDU is received 1100. If a PDU is received, determine whether the received PDU is within range 11101. If the received PDU is within range, i.e. SNsf≥smallest Missing_Pdu(SN), determine if Tsf(SNsf) is running 1102. If no timer Tsf(SNsf) is running and a MAC-sf PDU is received in order 1103 (SNsf=Next_SNsf) the SF-DC reordering entity may deliver 1104 this PDU to the MAC-d and may increment 1105 the value of Next_SNsf by one. If a missing PDU is detected by the WTRU 1103 (a MAC-sf PDU with SNsf>Next_SNsf is received) a new variable "Missing_Pdu(SNsf)" may be set 1106 to the value of Next_SNsf. An instance of Tsf(SNsf) may be started 1107 for this missing PDU. The received PDU may be stored 1108 in the reordering buffer at the place indicated by its SNsf. The value of Next_SNsf may be incremented 1109 by one until its value is different from the SNsf of the recently received PDU. The preceding may be accomplished in any combination and in any order. If one or more instances of Tsf(SNsf) are running 1102, the reordering entity may store the PDU received in the SNsf order in the reordering buffer 1117. If a detected missing PDU is received 1111 in time (if a MAC-sf PDU with SNsf equal to one of the Missing_Pdu(SNsf) variables is received before the corresponding Tsf(SNsf) expires) the corresponding timer Tsf(SNsf) may be stopped 1112. The received PDU may be stored 1113 in the reordering buffer at the place indicated by its SNsf. If Missing_Pdu(SNsf) is the only missing PDU 1114 (if no timers Tsf are running anymore), all of the stored PDUs may be delivered 1116 to the MAC-d. In the case of multiple missing PDUs 1114 (if at least one timer Tsf(SNsf) is still running) and if Missing_Pdu(SNsf) is the smallest among all the Missing_Pdu(SNsf), the stored PDUs having an SNsf<next Missing_Pdu(SNsf) may be delivered 1115 to the MAC-d. The preceding may be accomplished in any combination and in any order.

If an instance Tsf(SNsf) expires 1100 if there is no other Tsf timer running 1114, all of the stored PDUs may be delivered 1119 to the MAC-d. If this Tsf(SNsf) corresponds 1116 to the smallest Missing_Pdu(SNsf), the stored PDUs having SNsf<next Missing_Pdu(SNsf)−1 may be delivered 1120 to the MAC-d. If Next_SNsf is equal to this Missing_Pdu(SNsf)+1, Next_SNsf may be incremented 1118 by one. The preceding may be accomplished in any combination and in any order. If the SF-DC reordering entity receives a PDU 1100 with SNsf<smallest Missing_Pdu(SN) 1101, it may discard it 1110.

The value of Tsf may be fixed, may be determined by the WTRU, or may be configured by the network. The network may signal a minimum and a maximum value for Tsf. If the value of Tsf is configured by the network, it may be based on the network knowledge about the level of synchronization between the two NodeBs. For instance if the network is aware that the Node-Bs are transmitting at approximately the same time, it may configure the WTRU with a low value of Tsf. If the network knows that one Node-B transmits data a long period of time after the other Node-B, it may configure the WTRU with a long value of Tsf. In case of deactivation of the secondary single frequency HS-DSCH serving cell, the MAC-sf entity may be removed. The value of the timer Tsf may be set to zero.

The MAC layer second stage reordering may be based on the MAC-ehs Transmission Sequence Number (TSN) by splitting the range of allowed TSN valued per Node B (or alternative transmitting cell). The RNC may forward sequential blocks of MAC-d PDUs to each Node B and may assign non-overlapping ranges of TSN values, where the range of TSN values may indicate the sequence of blocks between the multiple Node Bs.

In one example realization, the RNC may transmit the first sequence of ten consecutive MAC-d PDUs to Node B2 with allowed TSN ranges 101-200. Upon reordering at the WTRU, the WTRU may first reorder PDUs within each TSN range (first stage reordering) and then may reorder based on TSN range (second stage reordering). In this example, the WTRU may deliver all data blocks received using TSN ranges 1-100 to the RLC first, and then may deliver all data blocks received using TSN ranges 101-200 to the RLC.

Figure 12A:
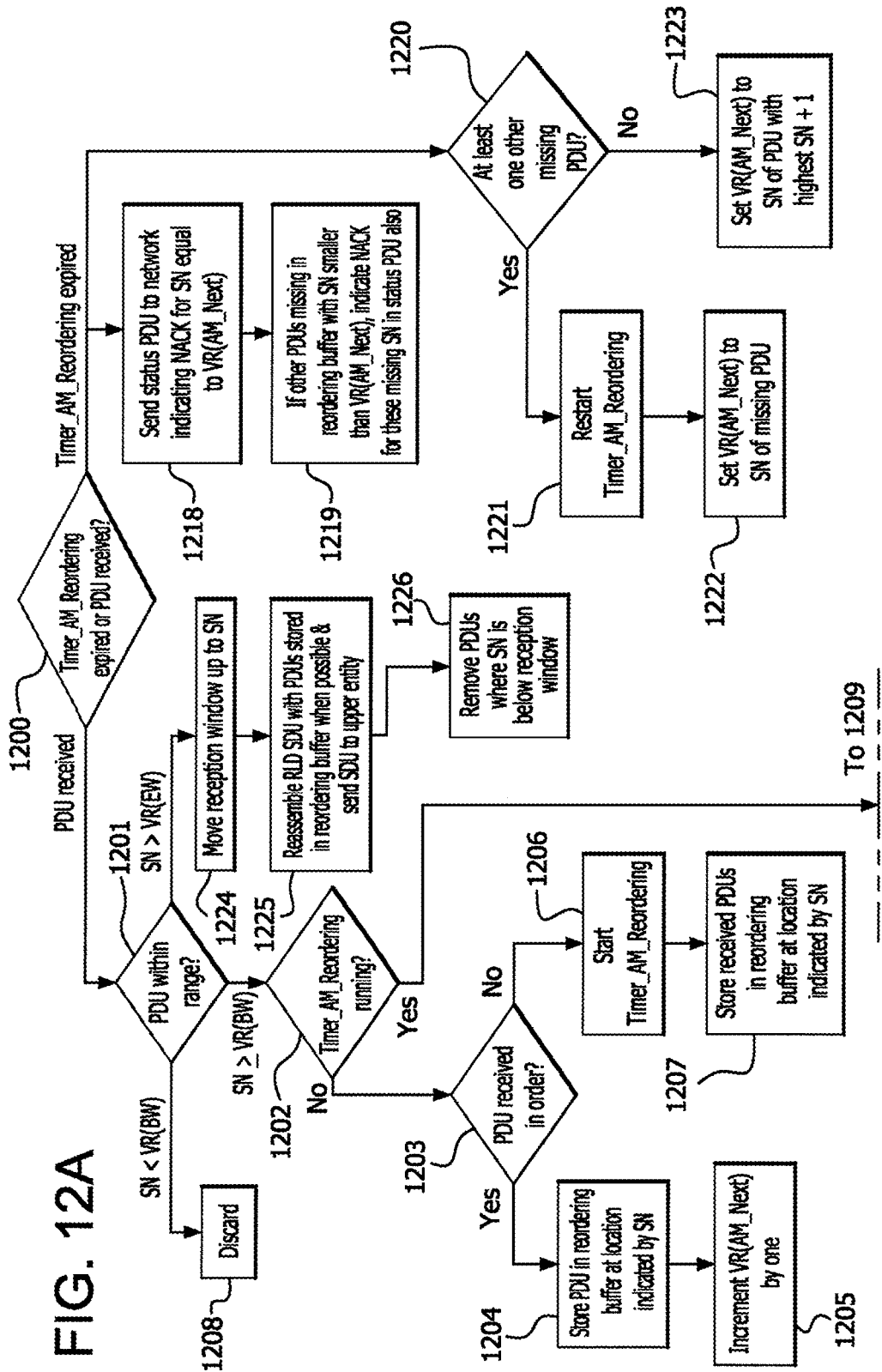
FIGS. 12A and 12B are a flow diagram that shows an alternative embodiment where one timer is used per missing sequence number.
Figure 12B:
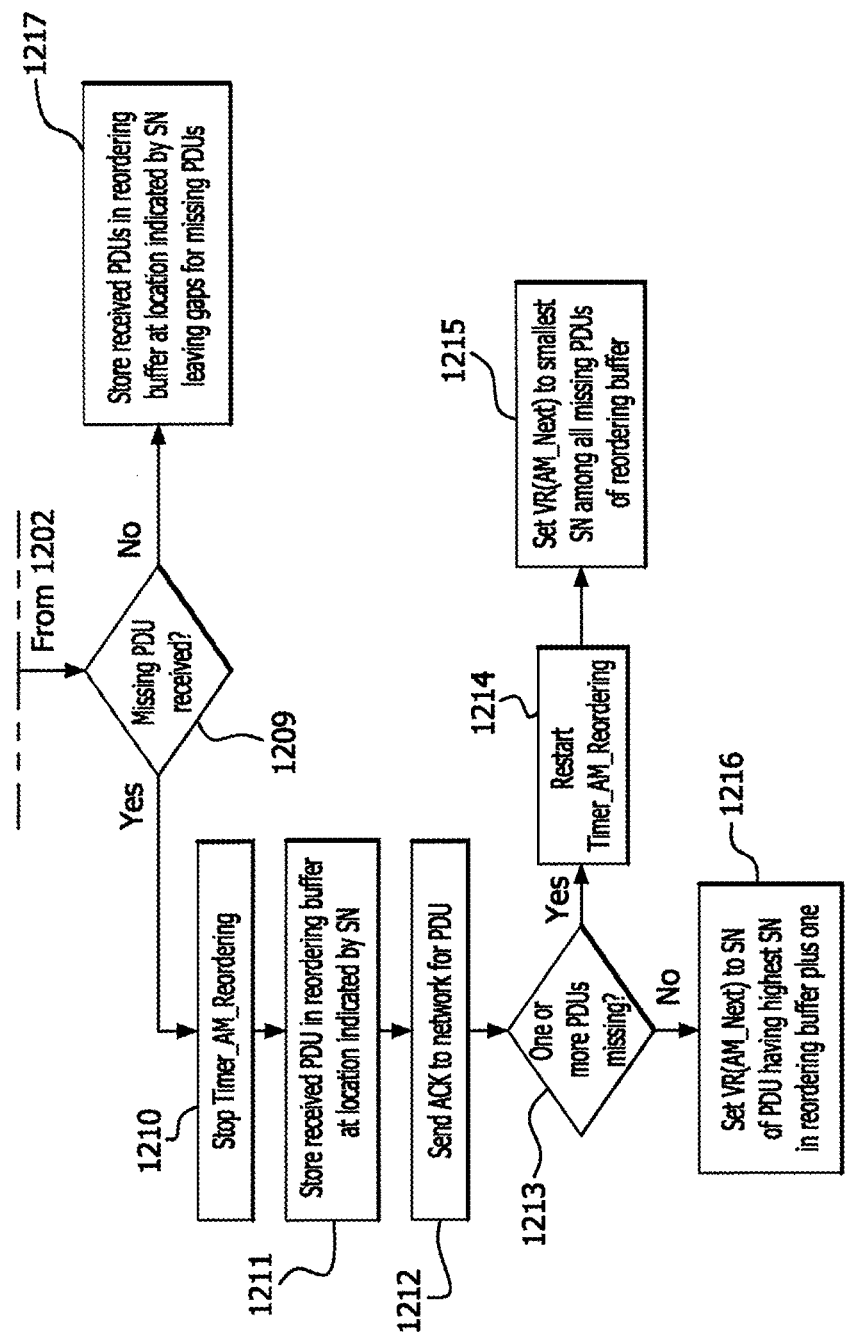

Alternatively or additionally, reordering may be performed in the RLC. The RLC may receive the packets from the MAC reordered per Node-B, or alternatively per cell, only and may perform the global reordering of packets from different MAC instances. If the WTRU has been configured with multiple MAC-ehs entities, the RLC may be configured with a new option indicating that the WTRU has to do reordering in RLC Acknowledgement Mode (AM). For example, the MAC may no longer be required to ensure in-order delivery of RLC PDUs from different sites. The RLC itself, if it detects a missing Sequence number, may optionally wait for a given period of time to ensure that the missing PDU or PDUs are not being transmitted by the other Node B, prior to triggering a RLC status report. The RLC reordering procedure may be applied for delivery of RLC SDUs to higher layers and/or status reporting to the transmitter side for the RLC AM The procedures in the RLC may be performed for acknowledgement mode (AM) logical channels and optionally unacknowledged mode RLC. FIGS. 12A and 12B are a flow diagram that shows an alternative embodiment where one timer is used per missing sequence number. A new timer called, for example, Timer_Am_Reordering may be defined and used to postpone the transmission of a STATUS PDU in case an AM Data (AMD) PDU is missing. The following definitions may be used. "Timer_Am_Reordering" may be a missing PDU timer. There may be one timer running at a given time. "VR(AM_NEXT)" may be a Sequence Number of the next expected PDU, for example, the SN following the SN of the last PDU received in-sequence. This variable may be initialized to zero. "Reordering_Window_Size" may be the size of the reception window where the WTRU RLC may receive a PDU. If a PDU is received with an SN before the window starts, the RLC should discard it. "VR(BW)" may be beginning of the window. This variable may be initialized to zero. "VR(EW)" may be the end of the window. This variable may be initialized to Reordering_Window_Size minus 1. All operations may calculate modulo the maximum SN.

The following may describe the RLC behavior for this first solution as shown in FIGS. 12A and 12B. A determination is made as to whether Timer_AM_Reordering has expired or a PDU is received 1200. If a PDU is received, determine whether the received PDU is within range 1201. If the received PDU is within range, i.e. SN≥VR(BW), determine if Timer_AM_Reordering is running 1202. If Timer_Am_Reordering is not running and if the RLC receives a PDU in sequence order 1203 (the SN of the received PDU is equal to VR(AM_NEXT)), it stores 1204 it in the reordering buffer at the place indicated by its SN and increment 1205 VR(AM_NEXT) by one. If the RLC may reassemble a RLC SDU by using the ordered PDUs from the reordering buffer, it may deliver 1204 the SDU to the upper entity. If the RLC detects a gap 1203 in the reception (the received PDU has an SN>VR(AM_NEXT)) if Timer_Am_Reordering is not running, it may start 1206 Timer_Am_Reordering. The received PDU may be stored 1207 in the reordering buffer at the place indicated by SN. While Timer_Am_Reordering is running 1202, the RLC may store the received PDUs in their SN order in the reordering buffer, leaving gaps 1217 if PDUs are missing.

If the detected missing PDU is received in time 1209 (if a PDU with an SN equal to VR(AM_NEXT) is received before Timer_Am_Reordering expires) Timer_Am_Reordering may be stopped 1210. The received PDU may be stored 1211 in the reordering buffer at the place indicated by its SN. An acknowledgement (ACK) may be transmitted 1212 to the network for this PDU. If in the reordering buffer, one or more PDUs are still missing 1213 (gaps exist in the SN), Timer_Am_Reordering may be restarted 1214 or VR(AM_NEXT) may be set 1215 to the smallest SN among all of the missing PDUs of the reordering buffer. If no PDUs are missing 1213 in the reordering buffer (no gap exists in the SN): VR(AM_NEXT) may be set 1216 to the SN of the PDU having the highest SN in the reordering buffer plus one (VR (AM_NEXT)=highest SN+1). If the RLC may reassemble an RLC SDU from the stored PDU, the SDU may be delivered to the upper layer (e.g. all the RLC PDUs for a given RLC SDU are received). The preceding may be accomplished in any combination and in any order.

If Timer_Am_Reordering expires 1200 STATUS PDU may be transmitted 1218 to the network indicating a negative acknowledgement (NACK) for the SN equal to VR(AM_NEXT) and if other PDUs are missing 1219 in the reordering buffer with an SN smaller than VR(AM_NEXT), a NACK may be indicated for the missing SN in the STATUS PDU as well and optionally an ACK for all received PDUs may also be reported. If there is at least another missing 1220 PDU in the reordering buffer which is in the reception window, Timer_Am_Reordering may be restarted 1221 or VR(AM_NEXT) may be set 1222 to the SN of the missing PDU. If there are no more PDUs missing 1220 in the reordering buffer, VR(AM_NEXT) may be set 1223 to the SN of the PDU with the highest SN plus one (VR(AM_NEXT)=highest SN+1). The preceding may be accomplished in any combination and in any order.

If the RLC receives a PDU 1200 with an SN that is before the beginning of the reception window (SN<VR(BW)) 1201, it may discard the PDU 1208. If the WTRU receives a PDU 1200 with a higher SN than VR(EW) 1201, the WTRU may move the reception window up to this SN 1224, i.e. VR(BW)=VR(BW)+(SN−VR(EW)) and VR(EW)=SN. The WTRU may reassemble the RLD SDU with the PDUs stored in the reordering buffer, if possible, and transmit the SDU to the upper entity 1225. The WTRU may remove the PDUs for which SN is below the reception window from the reordering buffer 1226. The preceding may be accomplished in any combination and in any order.

Alternatively or additionally, one timer may be used per missing PDU. A new instance of the reordering timer may be started per missing PDU. The following definitions may be used herein. "Timer_SR(SNm)" may be a missing PDU timer. There may be one instance of Timer_SR per missing PDU. "Missing_Var(SNm)" may be the missing PDU Sequence Number. There may be one instance of Missing_Var(SNm) per missing PDU. "VR(NEXT)" may be the Sequence Number of the PDU with highest SN plus one. This variable may be initialized to zero. "Reordering_Window_Size" may be the size of the reception window in which the WTRU RLC may receive a PDU. If a PDU is received with an SN before the window starts, the RLC may discard it. "VR(BW)" may be the beginning of the window.

This variable may be initialized to zero. "VR(EW)" may be the end of the window. This variable may be initialized to Reordering_Window_Size minus 1.

Figure 13A:
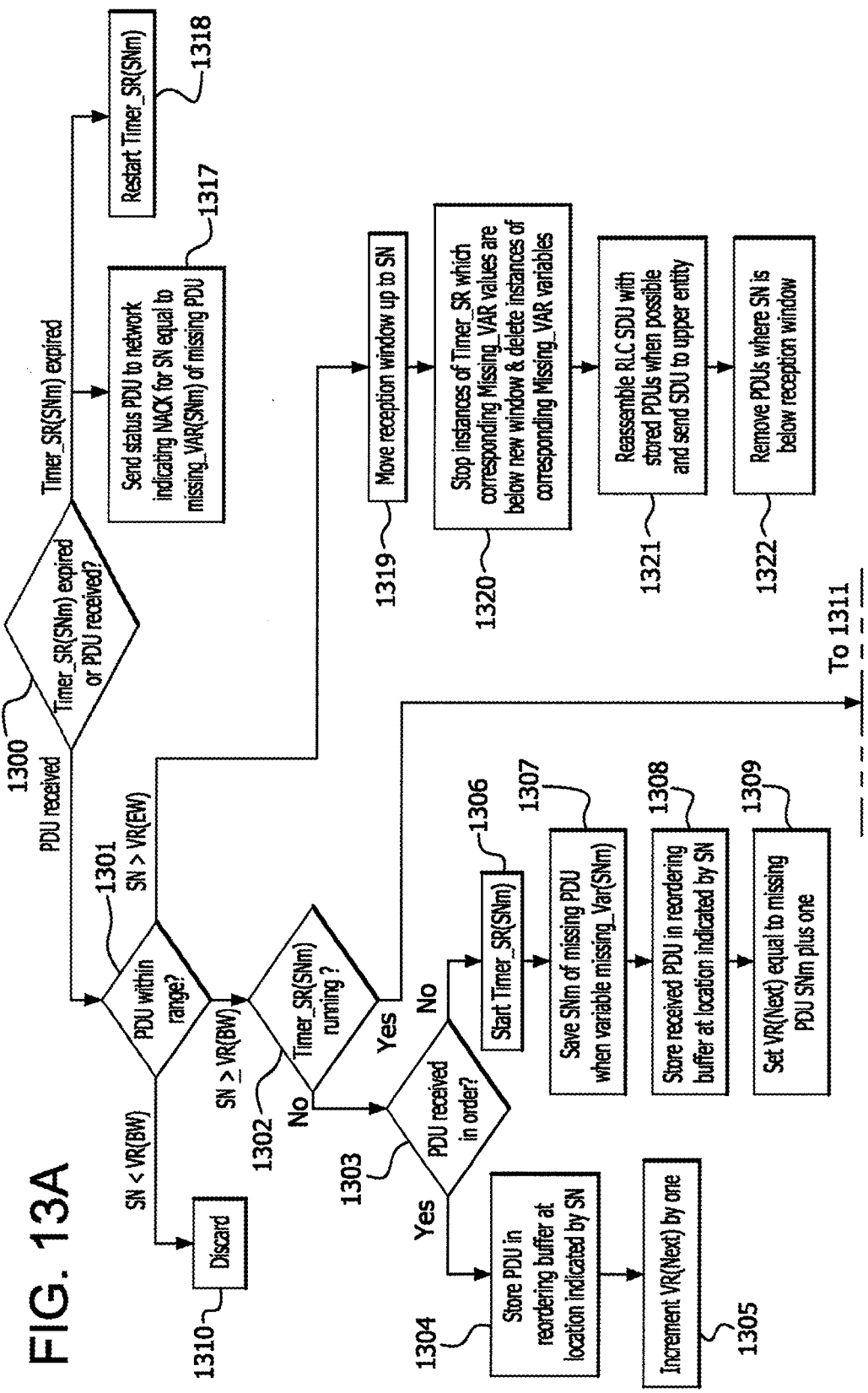
FIGS. 13A and 13B are a flow diagram that shows the RLC behavior.
Figure 13B:
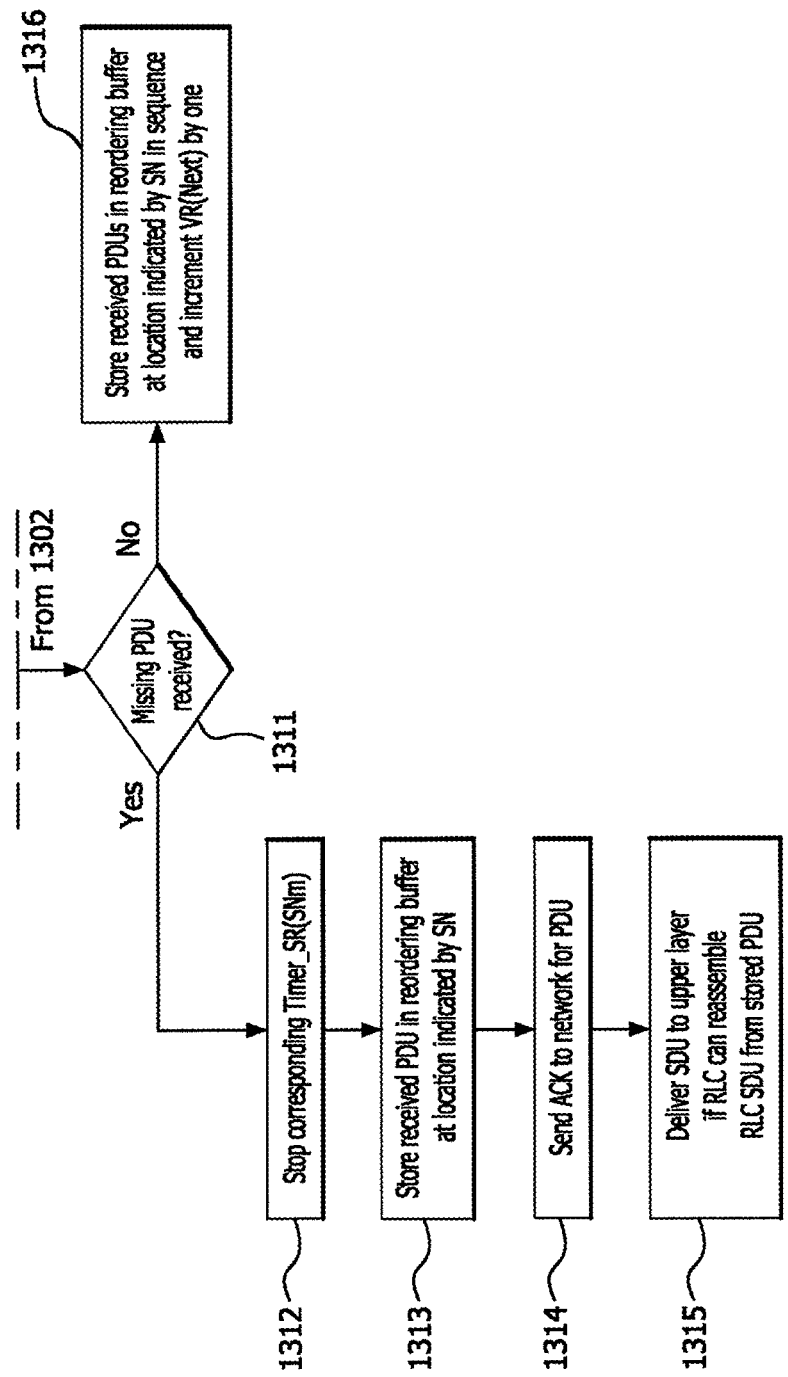

FIGS. 13A and 13B are a flow diagram that shows the RLC behavior. A determination is made as to whether Timer_SR(SNm) has expired or a PDU is received 1300. If a PDU is received, determine whether the received PDU is within range 1301. If the received PDU is within range, i.e. SN≥VR(BW), determine if Timer_SR(SNm) is running 1302. If no instance of Time_SR is running 1302 and if the RLC receives a PDU in sequence order 1303 (the SN of the received PDU is equal to VR(NEXT)), it may stores 1304 the PDU in the reordering buffer at the place indicated by its SN and increment 1305 VR(NEXT) by one. Each time the RLC may reassemble a RLC SDU by using the ordered PDUs from the reordering buffer, it may deliver the SDU to the upper entity. If the RLC detects a gap 1303 in the reception (the received PDU has an SN>VR(NEXT)) an instance of Timer_SR(SNm) may be started 1306 for the missing PDU. The SNm of this missing PDU may be saved 1307 in an instance of the variable Missing_Var(SNm). The received PDU may be stored 1308 in the reordering buffer at the place indicated by SN. VR(NEXT) may be set 1309 equal to the missing PDU SNm plus one (VR(NEXT) =Missing Var(SNm)+1). The preceding may be accomplished in any combination and in any order.

If one or more instances of Timer_SR are running 1302, the RLC may store the PDUs received in-sequence (without gaps) in their SN order in the reordering buffer and may increment VR(NEXT) by one 1316. If the detected missing PDU is received in time 1311, (if a PDU with an SN equal to one of the instances of Missing_Var(SNm) is received before the corresponding Timer_SR(SNm) expires) the corresponding timer Timer_SR(SNm) may be stopped 1312. The received PDU may be stored 1313 in the reordering buffer at the place indicated by its SN. An ACK may be transmitted 1314 to the network for the PDU. If the RLC may reassemble an RLC SDU from the stored PDU, the SDU may be delivered 1315 to the upper layer. The preceding may be accomplished in any combination and in any order.

If one of the instances of Timer_SR(SNm) expires 1300 a STATUS PDU may be transmitted 1317 to the network indicating a NACK for the SN equal to Missing_Var(SNm) of this missing PDU. The RLC may restart 1318 Timer_SR (SNm). If the RLC receives a PDU 1300 with an SN that is before the beginning of the reception window (SN<VR (BW)) 1301, it may discard the PDU 1310. If the WTRU receives a PDU 1300 with a higher SN than VR(EW) 1301 the reception window may be moved up 1319 to this SN (VR(BW)=VR(BW)+(SN−VR(EW)) and VR(EW)=SN). The instances of Timer_SR for which corresponding Missing_Var values are below the new window may be stopped and the instances of the corresponding Missing_Var variables may be deleted 1320. The RLC SDU with the PDUs stored in the reordering buffer may be reassembled, if possible, and the SDU may be transmitted to the upper entity 1321. The PDUs for which SN is below the reception window may be removed from the reordering buffer 1322. The preceding may be accomplished in any combination and in any order. Timer_SR may have a fixed value, may be determined by the WTRU, or may be configured by the network in a Radio Resource Control (RRC) message.

There may be limitations on the waiting duration and limitations on the number of requests for a missing packet. After a maximum number of retransmissions for a particular PDU, the RLC on the network side may be to reset. However, some controls may be implemented on the WTRU side as well as follows. The WTRU RLC may limit the number of times it may request a retransmission for the same missing PDU according to the following.

A new variable called, for example, V_RN may be defined per missing PDU initialized to zero and may be used to track how many times Timer_SR has been started for a particular PDU identified by an SN. If the RLC transmits the STATUS_PDU due to a missing PDU, it may start Timer_SR again for the PDU and may increment the new variable V_RN by one for this PDU. A maximum number of retries may be defined and may be called MAX_RN. If V_RN becomes greater than MAX_RN for a particular missing PDU and the Timer_SR expires while this PDU has still not been received, this PDU may be considered lost, and the RLC may discard all of the PDUs belonging to the same SDU that the missing PDU and may optionally transmit a STATUS_PDU or another type of indicator to the network indicating that it is not waiting for this PDU anymore including the SN of the PDU. MAX_RN may be a fixed value, determined by the WTRU or configured by the network. Additionally, it may depend on the value of the existing variable MaxDAT which represents the maximum number of retransmissions of an AMD PDU plus one. For example, it may be equal to MaxDAT or it may be equal to MaxDAT minus a constant value. V_RN may be a static or dynamic variable. It may be reset to zero if the missing PDU is received, or if the maximum value of V_RN (MAX_RN) is reached.

Additionally, there may be a maximum number of missing PDUs the RLC may wait for simultaneously. This may translate in a maximum number of Timer_SR that may run at the same time. For example, if the RLC detects a missing PDU, it may only start a new Timer_SR if the maximum number of Timer_SR has not been reached. Otherwise, it may consider this PDU as lost and discard all of the PDUs belonging to the same SDU and it may optionally transmit a STATUS_PDU or another indication to the peer RLC on the network side indicating that it may not wait for this PDU anymore including the SN of this PDU.

Alternatively, another timer called, for example, Timer_MaxRN may be defined. The time, Timer_MaxRN, may take a value not dependent on Timer_SR, or the value may be a multiple of Timer_SR. One of the minimum conditions on the setting of Timer_MaxRN may be that Timer_MaxRN has to be longer that Timer_SR. The WTRU RLC may start the timer Timer_MaxRN at the same time it starts Timer_SR for a particular missing PDU the first time this PDU is detected as missing. This may be accomplished instead of when the retransmissions of the PDU are also missing. If T_RN expires, Timer_MaxRN may still be running. If the missing PDU arrives, T_RN and T_MaxRN may be stopped. If Timer_MaxRN expires, the WTRU may consider the missing PDU as lost, stop Timer_SR, discard all the PDUs belonging to the same SDU as the missing PDU, and optionally transmit a STATUS_PDU to the network indicating that the WTRU may not wait for this missing PDU anymore, including the SN of this PDU.

In case the WTRU transmits a STATUS PDU to indicate to the network that it may not wait for a missing PDU with a certain SN or several missing PDUs, a new super-field (SUFI) type may be defined by using one of the reserved SUFI types bit combinations between 1001-1111. This new SUFI type may be called for example "No More Retries." The "No More Retries" SUFI may include the SN of one missing PDU or a list of missing PDUs for which the WTRU RLC will not wait for a retransmission anymore. If the network receives this indication from the WTRU, it may start an RLC reset procedure.

Unacknowledgement Mode (UM) may be used where the existing "out of sequence SDU delivery" functionality of the RLC UM may be reused to reorder the PDUs received from the MAC if two MAC-ehs entities are configured. This may allow the RLC UM on the WTRU and on the UTRAN side to be configured with "out of sequence SDU delivery" for DCCH and DTCH logical channels, in addition to the MCCH logical channel.

In the case of no second stage reordering, logical channels may be distributed between Node-Bs. Node-Bs transmitting to a same WTRU may only transmit over different logical channels. For example, one Node-B may transmit control information by using Signaling Radio Bearers (SRBs), while the other Node-B may transmit data using Radio Bearers (RBs). Another example may be that one Node-B may transmit data with RB1 while the other Node-B may transmit data with RB2 (for example, VoIP and Web browsing). Because there is one reordering queue per logical channel, existing MAC and RLC procedures may be used with this solution.

When dynamic switching and synchronization may be used between Node-Bs, the node-Bs may not transmit data simultaneously to the WTRU. Instead, the transmitting Node-B may be switched dynamically, meaning that Node-Bs may transmit one after another every x number of Transmission Time Intervals (TTIs). In this case, in order to minimize the impact on the WTRU (to minimize the changes required in the MAC), some synchronization regarding the TSN may be designed between the two Node-Bs. Instead of having the transmission sequence number generated independently on each Node-B, the transmission sequence numbers may be synchronized between Node-Bs, so that there is one common sequence numbering between the Node-Bs. For example, the TSN received at the WTRU in the MAC-ehs entity may be unique even if different Node-Bs are transmitting.

In one alternative, if one Node-B is finished with its current transmission, it may indicate the last TSN it has used to the other Node-B over the Iub or Iur interface, so that the other Node-B may start its new transmission with the TSN following the TSN received from the other Node-B.

If the WTRU detects an order or an indication that the Node Bs are changing, the WTRU may signal in the uplink (UL) direction using a MAC PDU (for example, a MAC-i PDU or a control MAC PDU) the last TSN number it received for each reordering queue.

Alternatively or additionally, each Node-B may reset its TSN when it starts a new transmission. The WTRU, if it detects a change on Node B or cell, may reset its next_expected_TSN variable, may reinitialize its RcvWindow_UpperEdge variable, or may stop timer T1 if running every time it detects it is receiving data from a different Node-B. The WTRU may detect whether it is receiving from a particular Node-B as described above and may optionally flush its HARQ buffers.

Different HARQ architectures may be defined depending on the transmission design chosen for SF-DC. If the two Node-Bs transmit the same set of data, soft combining may be achieved in the WTRU. One HARQ entity may be required in the MAC-ehs entity on the WTRU side. If the two Node-Bs transmit different set of data simultaneously, two HARQ entities may be designed in the WTRU as shown in FIGS. 2-9. Two sets of HARQ processes may also be configured (for example, 12 where there are 6 HARQ processes per cell), but the HARQ processes may be shared across all cells.

In case of dynamic switching as described above (each Node-B transmits a different set of data but not simultaneously), there may be two HARQ entities in the MAC or one common HARQ entity shared by both Node-Bs which may allow packets transmitted from one Node-B to be retransmitted by the other Node-B. In case of a common HARQ entity, Node-Bs have to synchronize their NDI.

In one example, if one Node-B is finished with its current transmission, it may indicate to the other Node-B the last value of the New Data Indicator (NDI) it has used on each HARQ process so that the other Node-B may properly set the value of the NDI it transmits to the WTRU.

Alternatively or additionally, each Node-B may reset its NDI to zero if it starts a new transmission and the WTRU may consider that it is a first transmission in the HARQ process if it detects that it is receiving from a different Node-B.

Although features and elements are described above in particular combinations, one of ordinary skill in the art will appreciate that each feature or element may be used alone or in any combination with the other features and elements. In addition, the methods described herein may be implemented in a computer program, software, or firmware incorporated in a computer-readable medium for execution by a computer or processor. Examples of computer-readable media include electronic signals (transmitted over wired or wireless connections) and computer-readable storage media. Examples of computer-readable storage media include, but are not limited to, a read only memory (ROM), a random access memory (RAM), a register, cache memory, semiconductor memory devices, magnetic media such as internal hard disks and removable disks, magneto-optical media, and optical media such as CD-ROM disks, and digital versatile disks (DVDs). A processor in association with software may be used to implement a radio frequency transceiver for use in a WTRU, UE, terminal, base station, RNC, or any host computer.

What is claimed:
1. A method for two-stage reordering of received protocol data units (PDUs) in a wireless communication system, the method comprising:
  receiving, in a wireless transmit receive unit (WTRU) PDUs from a plurality of Node-Bs, wherein each of the received PDUs has a transmission sequence number (TSN);
  reordering the received PDUs from each of the plurality of Node-Bs using the TSN in a MAC layer in different reordering queues;
  delivering the received PDUs from a plurality of reordering queues to one logical channel in an RLC layer;
  reordering the received PDUs in the RLC layer based on a sequence number (SN);
  starting a timer when at least a RLC PDU is missing based on SN of the RLC PDU; and
  receiving, in at least one of the plurality of Node-Bs, a status report from the WTRU indicating missing RLC PDU based on SN of the RLC PDU on a condition that the timer expires, wherein the transmission of the status report is delayed on a condition that a RLC PDU is missing based on SN of the RLC PDU and the timer is running.

2. The method of claim 1 further comprising:
restarting the timer; and
setting a SN of a next expected RLC PDU to the SN of the missing RLC PDU on a condition that the timer expires and at least one other RLC PDU is missing.

3. The method of claim 1 further comprising:
setting a SN of a next expected RLC PDU to the SN of the RLC PDU with a highest SN plus one on a condition that the timer expires and no other RLC PDU is missing.

4. The method of claim 1 wherein the transmitted status report indicates a negative acknowledgement (NACK) if other RLC PDUs are missing in a reordering buffer with a SN smaller than the SN of a next expected RLC PDU.

5. A wireless communication system for two-stage reordering of received protocol data units (PDUs) comprising:
   a receiver, in a wireless transmit receive unit (WTRU), configured to receive PDUs from a plurality of Node-Bs, wherein each of the received PDUs has a transmission sequence number (TSN);
   a first reordering entity, in the WTRU, configured to reorder the received PDUs from each of the plurality of Node-Bs using the TSN in a MAC layer in different reordering queues;
   a processor, in the WTRU, configured to deliver the received PDUs from a plurality of reordering queues to one logical channel in an RLC layer;
   a second reordering entity, in the WTRU, configured to reorder the received PDUs in the RLC layer based on a sequence number (SN);
   a timer, in the WTRU, configured to start when at least a RLC PDU is missing based on SN of the RLC PDU; and
   a receiver, in at least one of the plurality of Node-Bs, configured to receive a status report indicating missing RLC PDU based on SN of the RLC PDU on a condition that the timer expires, wherein the transmission of the status report is delayed on a condition that a RLC PDU is missing based on SN of the RLC PDU and the timer is running.

6. The wireless communication system of claim 5 further comprising:
   circuitry further configured to restart the timer; and
   circuitry further configured to set a SN of a next expected RLC PDU to the SN of the missing RLC PDU on a condition that the timer expires and at least one other RLC PDU is missing.

7. The wireless communication system of claim 5 further comprising:
   circuitry further configured to set a SN of a next expected RLC PDU to the SN of the RLC PDU with a highest SN plus one on a condition that the timer expires and no other RLC PDU is missing.

8. The wireless communication system of claim 7 wherein the transmitted status report indicates a negative acknowledgement (NACK) if other RLC PDUs are missing in a reordering buffer with a SN smaller than the SN of a next expected RLC PDU.

* * * * *